(12) United States Patent
Sotzing

(10) Patent No.: US 11,898,000 B2
(45) Date of Patent: Feb. 13, 2024

(54) HIGH DIELECTRIC BREAKDOWN POLYMERS; COMPOSITIONS; METHODS OF MAKING; AND USE THEREOF

(71) Applicant: University of Connecticut, Farmington, CT (US)

(72) Inventor: Gregory A. Sotzing, Storrs, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 893 days.

(21) Appl. No.: 16/919,339

(22) Filed: Jul. 2, 2020

(65) Prior Publication Data
US 2021/0284789 A1    Sep. 16, 2021

Related U.S. Application Data

(60) Provisional application No. 62/870,213, filed on Jul. 3, 2019.

(51) Int. Cl.
*C08G 61/12* (2006.01)
*H01G 4/18* (2006.01)

(52) U.S. Cl.
CPC .......... *C08G 61/124* (2013.01); *H01G 4/18* (2013.01); *C08G 2261/3342* (2013.01); *C08G 2261/418* (2013.01); *C08G 2261/60* (2013.01); *C08G 2261/90* (2013.01)

(58) Field of Classification Search
None
See application file for complete search history.

(56) References Cited

U.S. PATENT DOCUMENTS

| | | | | |
|---|---|---|---|---|
| 8,223,472 B1* | 7/2012 | Dirk | ........................ | H01G 4/18 |
| | | | | 361/313 |
| 9,786,409 B2* | 10/2017 | Flores | ..................... | H10K 19/10 |
| 2011/0101329 A1* | 5/2011 | Kastler | ................. | C08G 61/126 |
| | | | | 257/40 |
| 2016/0060409 A1* | 3/2016 | Kim | .......................... | C08J 5/18 |
| | | | | 526/272 |
| 2016/0289392 A1* | 10/2016 | Grubbs | ................. | C08L 87/005 |
| 2017/0018801 A1* | 1/2017 | Grubbs | ................... | C08G 61/02 |
| 2020/0362117 A1* | 11/2020 | Chabinyc | ............. | C08G 83/005 |
| 2021/0284789 A1* | 9/2021 | Sotzing | ..................... | H01G 4/18 |

FOREIGN PATENT DOCUMENTS

| CN | 102850544 A | * | 1/2013 | .......... B01J 31/1691 |
|---|---|---|---|---|
| CN | 105175660 A | * | 12/2015 | ........ B01D 67/0016 |
| EP | 0099055 A1 | * | 1/1984 | |
| JP | 2009532555 A | * | 9/2009 | |
| JP | 2015227443 A | * | 12/2015 | ............ B01D 71/26 |
| WO | WO-2010000755 A1 | * | 1/2010 | ........... C08G 61/124 |

(Continued)

OTHER PUBLICATIONS

International Search Report and Written Opinion; International Application No. PCT/US20/40597; International Filing Date Jul. 2, 2020; dated Jun. 4, 2021; 10 Pages.

(Continued)

*Primary Examiner* — Dion R. Ferguson
(74) *Attorney, Agent, or Firm* — CANTOR COLBURN LLP

(57) ABSTRACT

All organic, dielectric polymers with high discharge efficiency at elevated operation temperatures are reported.

17 Claims, 7 Drawing Sheets

(56) References Cited

FOREIGN PATENT DOCUMENTS

| WO | 2019144082 A1 | 7/2019 | |
|---|---|---|---|
| WO | WO-2021086453 A2 * | 5/2021 | ............ C08F 122/40 |

OTHER PUBLICATIONS

Azizi, A. et al., High-Performance Polymers Sandwiched with Chemical Vapor Deposited Hexagonal Boron Nitrides as Scalable High-Temperature Dielectric Materials. Adv Mater 29 1701864 (2017).

Cao, Y., Irwin, P. C. & Younsi, K., The future of nanodielectrics in the electrical power industry. IEEE T Dielect EL IN 11 797 (2004).

Dang, Z. et al., Fabrication and Dielectric Characterization of Advanced BaTiO3/Polyimide Nanocomposite Films with High Thermal Stability. Adv Funct Mater 18 1509 (2008).

Ho, J. S. & Greenbaum, S. G., Polymer Capacitor Dielectrics for High Temperature Applications. ACS Appl Mater Inter 10 29189 (2018).

Ieda, M., Nagao, M. & Hikita, M., High-field Conduction and Breakdown in Insulating Polymers. IEEE T Dielect EL IN 1 934 (1994).

Islam, M. S., Qiao, Y., Tang, C. & Ploehn, H. J., Terthiophene-Containing Copolymers and Homopolymer Blends as High-Performance Dielectric Materials. ACS Appl Mater Inter 7 1967 (2015).

Johnson, R. W., Evans, J. L., Jacobsen, P., Thompson, J. R. R. & Christopher, M., The Changing Automotive Environment: High-Temperature Electronics. IEEE Transactions on Electronics Packaging Manufacturing 27 164 (2004).

Li et al., "Transient characterization of extreme field conduction in dielectrics." AIP Adv 6 115025 (2016).

Li, H. et al., Scalable Polymer Nanocomposites with Record High-Temperature Capacitive Performance Enabled by Rationally Designed Nanostructured Inorganic Fillers. Adv Mater 1900875 (2019).

Li, He et al.; "Crosslinked fluoropolymers exhibiting superior high-temperature enrgy density and charge-discharge efficiency"; Energy Environ. Sci., 2020, 13, 1279-1286.

Li, Q. et al., Flexible high-temperature dielectric materials from polymer nanocomposites. Nature 523 576 (2015).

Li, Q. et al., Sandwich-structured polymer nanocomposites with high energy density and great charge-discharge efficiency at elevated temperatures. Proceedings of the National Academy of Sciences 113 9995 (2016).

Li, Z., Xu, C., Uehara, H., Boggs, S. & Cao, Y., Transient characterization of extreme field conduction in dielectrics. AIP Adv 6 115025 (2016).

Liu, F. et al., Poly(methyl methacrylate)/boron nitride nanocomposites with enhanced energy density as high temperature dielectrics. Compos Sci Technol 142 139 (2017).

Mannodi-Kanakkithodi, A. et al., Rational Co-Design of Polymer Dielectrics for Energy Storage. Adv Mater 286277 (2016).

Pan, J., Li, K., Chuayprakong, S., Hsu, T. & Wang, Q., High-Temperature Poly(phthalazinone ether ketone) Thin Films for Dielectric Energy Storage. ACS Appl Mater Inter 2 1286 (2010).

Rabuffi, M. & Picci, G., Status quo and future prospects for metallized polypropylene energy storage capacitors. IEEET Plasma Sci 30 1939 (2002).

Santiago, A.; Electrochemical performance of membranes based on hydrogenated polynorbornenes functionalized with imide side groups containing sulfonated fluorinated moieties. J Membrane Sci 403-404 121 (2012).

Sharma, V. et al., Rational design of all organic polymer dielectrics. Nat Commun 5 (2014).

Tan, D., Zhang, L., Chen, Q. & Irwin, P., High-Temperature Capacitor Polymer Films. J Electron Mater 43 4569 (2014).

Tlenkopatchev, M. A., Vargas, J., López-González, M. D. M. & Riande, E., Gas Transport in Polymers Prepared via Metathesis Copolymerization of exo-N-Phenyl-7-oxanorbornene-5,6-dicarboximide and Norbornene. Macromolecules 36 8483 (2003).

Vargas, J. et al., Gas Transport Properties of Hydrogenated and Fluorinated Polynorbornene Dicarboximides. Macromol Chem Phys 214 2607 (2013).

Vargas, J., Santiago, A. A., Tlenkopatchev, M. A., López-González, M. & Riande, E., Gas transport in membranes based on polynorbornenes with fluorinated dicarboximide side moieties. J Membrane Sci 361 78 (2010).

Watson, J. & Castro, G., high-temperature-electronic-pose-design-challenges. Analog Dialogue 46 (2012).

Wu, Chao et al.; "Flexible Temperature-Invariant Polymer Dielectrics with Large Bandgap"; Adv. Mater.; 2020, 32, p. 1-6.

Zhang, Z., Wang, D. H., Litt, M. H., Tan, L. & Zhu, L., High-Temperature and High-Energy-Density Dipolar Glass Polymers Based on Sulfonylated Poly(2,6-dimethyl-1,4-phenylene oxide). Angewandte Chemie International Edition 571528 (2018).

Zhou, Y. et al., A Scalable, High-Throughput, and Environmentally Benign Approach to Polymer Dielectrics Exhibiting Significantly Improved Capacitive Performance at High Temperatures. Adv Mater 1805672 (2018).

* cited by examiner

HIGH DIELECTRIC BREAKDOWN POLYMERS; COMPOSITIONS; METHODS OF MAKING; AND USE THEREOF

CROSS-REFERENCE TO RELATED APPLICATION

This application claims the benefit of U.S. Provisional Application No. 62/870,213 filed Jul. 3, 2019, which is hereby incorporated by reference in its entirety for all purposes.

This invention was made with government support under U.S. Office of Naval Research Grant No. N00014-17-1-2656 awarded by the U.S. Office of Naval Research. The U.S. government has certain rights in the invention.

BACKGROUND

Polyolefins such as polyethylene (PE) or polypropylene (PP) are generally used polymers for high electric field application owing to their large bandgap. However, some electronic devices are exposed high temperatures during their operation, and require high electric field stability simultaneously hence these applications require materials to be stable at harsh conditions. Unfortunately, currently used polymers with high electric field stability have low operating temperature because of their low glass transition temperature (Tg) or low melt temperature (Tm), limiting their use at elevated temperatures.

Biaxially-Oriented Poly-Propylene (BOPP) is the industrial standard material used today in high energy density capacitors. Generally, it has a breakdown of approximately 600 MV/m, very low loss at under 0.1%, however it is inoperable at temperatures above 90 to 100° C. As such, when the capacitor is discharged, thermal loss becomes an issue with rapid use. The structure of BOPP is not easily functionalized so there is limited synthetic options to improve properties. Further, it has a very low glass transition temperature making it a rubber at room temperature.

Higher temperature operation with polymers means that the high energy density capacitors can reach other applications such as the electric jet, and would also translate to more charge/discharge cycles with less stringent temperature control.

For continuously advancing electrical and electronic systems, polymers possessing conducting as well as insulating properties are indispensable, owing to their light weight, flexibility and ease of processing. Polymers having low electrical conduction under high temperature and electric field are of great importance for variety of applications. Unfortunately, up-to-date reported polymer systems either have low operating temperature, prominent electrical conduction or face flexibility and processing issues.

There remains a need in the art for new processable all organic dielectric polymers with high discharge efficiency at elevated operation temperatures.

SUMMARY

In an aspect, a dielectric polymer according to formula (II) or formula (III)

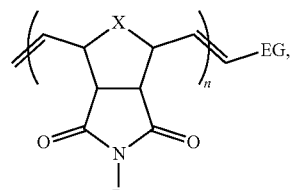
(II)

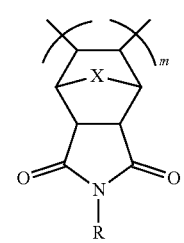
(III)

wherein
each X individually is O, S, $NR^1$, $C(R^2)_2$, or $C(R^2)_2$—$C(R^2)_2$ wherein $R^1$ is H, $C_{1-10}$ alkyl, specifically $C_{1-6}$ alkyl, $C_{1-10}$ haloalkyl, substituted or unsubstituted aryl, or substituted or unsubstituted heteroaryl, and each $R^2$ independently is H, halo, or $C_{1-10}$ alkyl, specifically $C_{1-6}$ alkyl, specifically X is O, S, NH, $NR^1$, or $CH_2$, and more specifically X is O or $CH_2$;

EG is an end group;

each R individually is a substituted or unsubstituted aryl or substituted or unsubstituted heteroaryl, wherein each of the substituted aryl and substituted heteroaryl of group R and $R^1$ is substituted with 1, 2, 3, 4, or 5 substituents, specifically R is substituted aryl, more specifically R is 2-substituted phenyl or 3,5-disubstituted phenyl wherein the substitution is $C_{1-6}$ alkyl or $C_{1-6}$ haloalkyl, each substituent on the substituted aryl and substituted heteroaryl of groups R and $R^1$ independently is $C_{1-20}$ alkyl, specifically $C_{1-8}$ alkyl, $C_{1-20}$ haloalkyl, specifically $C_{1-8}$ haloalkyl, $C_{1-20}$ alkoxy, specifically $C_{1-8}$ alkoxy, $C_{1-20}$ haloalkoxy, specifically $C_{1-8}$ haloalkoxy, halo, —$NH_2$, —$NHR^3$, —$N(R^3)_2$, nitro, cyano, hydroxyl, aryl, heteroaryl, or a combination thereof, wherein $R^3$ is $C_{1-20}$ alkyl, specifically $C_{1-8}$ alkyl;

n is about 74 to about 200, specifically about 100 to about 175, and more specifically about 125 to about 150; and m is about 74 to about 200, specifically about 100 to about 175, and more specifically about 125 to about 150.

In another aspect, a monomer according to formula (I)

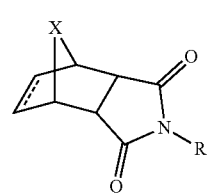
(I)

wherein

X is O, S, NR$^1$, C(R$^2$)$_2$, or C(R$^2$)$_2$—C(R$^2$)$_2$ wherein R$^1$ is H, C$_{1-10}$ alkyl, specifically C$_{1-6}$ alkyl, C$_{1-10}$ haloalkyl, substituted or unsubstituted aryl, or substituted or unsubstituted heteroaryl, and each R$^2$ independently is H, halo, or C$_{1-10}$ alkyl, specifically C$_{1-6}$ alkyl, specifically X is O, S, NH, NR$^1$, or CH$_2$, and more specifically X is O or CH$_2$;

------- is a single or double bond;

R is a substituted or unsubstituted aryl or substituted or unsubstituted heteroaryl, wherein each of the substituted aryl and substituted heteroaryl of R and R$^1$ is substituted with 1, 2, 3, 4, or 5 substituents, specifically R is substituted aryl, more specifically R is 2-substituted phenyl or 3,5-disubstituted phenyl wherein the substitution is C$_{1-6}$ alkyl or C$_{1-6}$ haloalkyl, each substituent on the substituted aryl and substituted heteroaryl of groups R and R$^1$ independently is C$_{1-20}$ alkyl, specifically C$_{1-8}$ alkyl, C$_{1-20}$ haloalkyl, specifically C$_{1-8}$ haloalkyl, C$_{1-20}$ alkoxy, specifically C$_{1-8}$ alkoxy, C$_{1-20}$ haloalkoxy, specifically C$_{1-8}$ haloalkoxy, halo, —NH$_2$, —NHR$^3$, —N(R$^3$)$_2$, nitro, cyano, hydroxyl, aryl, heteroaryl, or a combination thereof, wherein R$^3$ is C$_{1-20}$ alkyl, specifically C$_{1-8}$ alkyl.

In another aspect, a composition comprises a dielectric polymer as described herein.

In yet another aspect, an article comprises the dielectric polymer or composition described herein; such articles include, e.g. a capacitor, specifically a high energy density capacitor.

In another aspect, a process for producing a dielectric polymer, comprises conducting Ring Opening Metathesis Polymerization or vinyl addition polymerization of a monomer of formula (I)

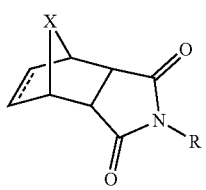

(I)

wherein

X is O, S, NR$^1$, C(R$^2$)$_2$, or C(R$^2$)$_2$—C(R$^2$)$_2$ wherein R$^1$ is H, C$_{1-10}$ alkyl, specifically C$_{1-6}$ alkyl, C$_{1-10}$ haloalkyl, substituted or unsubstituted aryl, or substituted or unsubstituted heteroaryl, and each R$^2$ independently is H, halo, or C$_{1-10}$ alkyl, specifically C$_{1-6}$ alkyl, specifically X is O, S, NH, NR$^1$, or CH$_2$, and more specifically X is O or CH$_2$;

------- is a single or double bond;

R is a substituted or unsubstituted aryl or substituted or unsubstituted heteroaryl, wherein each of the substituted aryl and substituted heteroaryl of R and R$^1$ is substituted with 1, 2, 3, 4, or 5 substituents, specifically R is substituted aryl, more specifically R is 2-substituted phenyl or 3,5-disubstituted phenyl wherein the substitution is C$_{1-6}$ alkyl or C$_{1-6}$ haloalkyl, each substituent on the substituted aryl and substituted heteroaryl of group R and R$^1$ independently is C$_{1-20}$ alkyl, specifically C$_{1-8}$ alkyl, C$_{1-20}$ haloalkyl, specifically C$_{1-8}$ haloalkyl, C$_{1-20}$ alkoxy, specifically C$_{1-8}$ alkoxy, C$_{1-20}$ haloalkoxy, specifically C$_{1-8}$ haloalkoxy, halo, —NH$_2$, —NHR$^3$, —N(R$^3$)$_2$, nitro, cyano, hydroxyl, aryl, heteroaryl, or a combination thereof, wherein R$^3$ is C$_{1-20}$ alkyl, specifically C$_{1-8}$ alkyl.

In another aspect, a dielectric polymer, comprises:

a polymer backbone and a pendent group, the polymer backbone comprises alternating repeat units of a first rigid domain separated by single bonds, or alternating repeat units of a first rigid domain and a second rigid domain separated by single bonds, wherein the pendent group is an optionally substituted aromatic group attached to the first rigid domain by a single bond; and wherein the dielectric polymer has one or more of the following:

a.) Tg of greater than or equal to 150° C., specifically about 175 to about 350° C., more specifically about 180 to about 300° C., and yet more specifically about 200 to about 275° C.;

b.) Band gap of greater than or equal to 4.1 eV, specifically about 4.2 to about 5.5 eV, specifically about 4.1, about 4.2, about 4.3, about 4.4, about 4.5, about 4.6, about 4.7, about 4.8, about 4.9, about 5.0, about 5.1, about 5.2, about 5.3, about 5.4, or about 5.5 or any range in between;

c.) a maximum discharged energy density of greater than 5.0 J/cm$^3$ with efficiency at or above 90% at a temperature of 150° C. or 200° C., specifically about 5.5 to about 10 J/cm$^3$, more specifically about 6 to about 9 J/cm$^3$, yet more specifically about 7 to about 8 J/cm$^3$ with efficiency at or above 90% at a temperature of 150° C. or 200° C.;

d.) a maximum discharged energy density of greater than 5.0 J/cm$^3$ at a temperature of 150° C. and an electric field of greater than 650 MV/m or between 650 and 800 MV/m, specifically about 5.5 to about 10 J/cm$^3$, more specifically about 6 to about 9 J/cm$^3$, yet more specifically about 7 to about 8 J/cm$^3$ at a temperature of 150° C. and an electric field of greater than 650 MV/m or between 650 and 800 MV/m;

e.) an operating temperature from about −160 to about 250° C.;

f.) an operating temperature from about −160 to about 225° C.; and g.) an operating temperature from about −160 to about 200° C.

DETAILED DESCRIPTION

Figure 1:
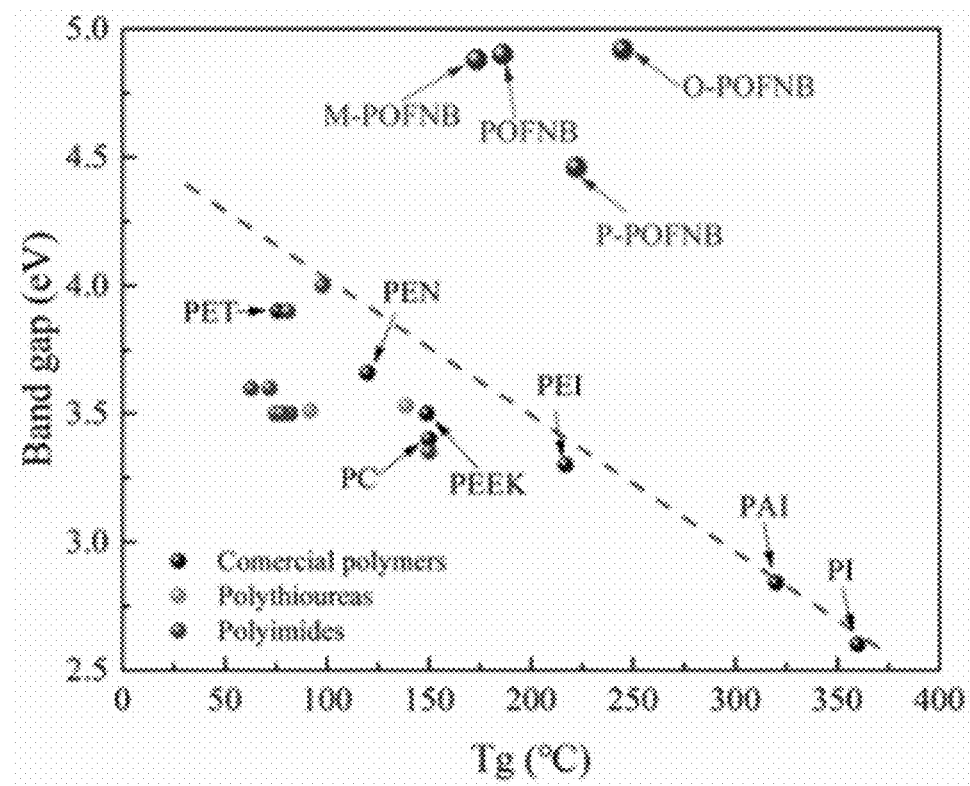
FIG. 1 Correspondence of band gap and glass transition temperature for POFNB and POFNB-type polymers and polymers with aromatic backbone structure whose high temperature polymers among them have been used as dielectrics in low electric field electronic applications.

Disclosed herein is a design strategy and synthesis of all organic polymer possessing high temperature and electric field stability along with flexibility and ease of processing. The synthesized polymer shows suppressed electrical conduction for a large temperature range compared to traditional polymers. Furthermore, the polymer is characterized as a dielectric material for capacitive energy storage performance at different temperatures. In one aspect, the dielectric polymer gives high discharged energy density with high efficiency at elevated temperature, surpassing all the best reported dielectric polymers or polymer composites.

Disclosed are all organic, flexible high-temperature insulating polymers with high discharged energy density. As defined herein, the all organic polymers exhibit high-temperature and discharged energy density without the addition of inorganic fillers such as silica, $Al_2O_3$, etc. as found in polymer composites and polymer nanocomposites.

In one aspect, an all organic, flexible high-temperature insulating polymer exhibits high Tg, high bandgap, and high discharged energy density over a wide operating temperature range. Specifically, the dielectric polymer meets the following parameters:

a.) Tg of greater than or equal to 150° C., specifically about 175 to about 350° C., more specifically about 180 to about 300° C., and yet more specifically about 200 to about 275° C.;

b.) Band gap of greater than or equal to 4.1 eV, specifically about 4.2 to about 5.5 eV, specifically about 4.1, about 4.2, about 4.3, about 4.4, about 4.5, about 4.6, about 4.7, about 4.8, about 4.9, about 5.0, about 5.1, about 5.2, about 5.3, about 5.4, or about 5.5 or any range in between;

c.) a maximum discharged energy density of greater than 5.0 $J/cm^3$ with efficiency at or above 90% at a temperature of 150° C. or 200° C., specifically about 5.5 to about 10 $J/cm^3$, more specifically about 6 to about 9 $J/cm^3$, yet more specifically about 7 to about 8 $J/cm^3$ with efficiency at or above 90% at a temperature of 150° C. or 200° C.;

d.) a maximum discharged energy density of greater than 5.0 $J/cm^3$ at a temperature of 150° C. and an electric field of greater than 650 MV/m or between 650 and 800 MV/m, specifically about 5.5 to about 10 $J/cm^3$, more specifically about 6 to about 9 $J/cm^3$, yet more specifically about 7 to about 8 $J/cm^3$ at a temperature of 150° C. and an electric field of greater than 650 MV/m or between 650 and 800 MV/m;

e.) an operating temperature from about −160 to about 250° C.;

f.) an operating temperature from about −160 to about 225° C.; and g.) an operating temperature from about −160 to about 200° C.

In an aspect, the dielectric polymer is according to formula (II) or formula (III)

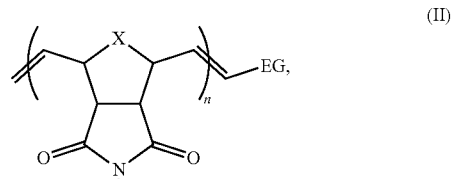

(II)

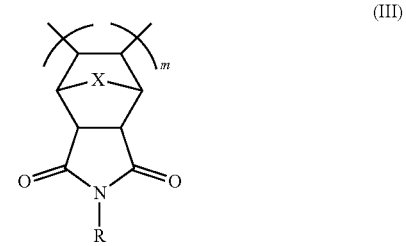

(III)

wherein each X individually is O, S, $NR^1$, $C(R^2)_2$, or $C(R^2)_2$—$C(R^2)_2$ wherein $R^1$ is H, $C_{1-10}$ alkyl, specifically $C_{1-6}$ alkyl, $C_{1-10}$ haloalkyl, substituted or unsubstituted aryl, or substituted or unsubstituted heteroaryl, and each $R^2$ independently is H, halo, or $C_{1-10}$ alkyl, specifically $C_{1-6}$ alkyl, specifically X is O, S, NH, $NR^1$, or $CH_2$, and more specifically X is O or $CH_2$;

EG is an end group;

each R individually is a substituted or unsubstituted aryl or substituted or unsubstituted heteroaryl, wherein each of the substituted aryl and substituted heteroaryl is substituted with 1, 2, 3, 4, or 5 substituents, specifically R is substituted aryl substituted by 1, 2, or 3 substituents, n is about 74 to about 200, specifically about 100 to about 175, and more specifically about 125 to about 150, and m is about 74 to about 200, specifically about 100 to about 175, and more specifically about 125 to about 150.

In an aspect, X of formula (II) or formula (III) is O, S, NH, $NR^1$, or $CH_2$, wherein $R^1$ is unsubstituted or substituted aryl or unsubstituted or substituted heteroaryl, wherein each of the substituted aryl and substituted heteroaryl is substituted with 1, 2, 3, 4, or 5 substituents.

In a further aspect, each substituent on the substituted aryl and substituted heteroaryl of group R or $R^1$ in formula (II) and formula (III) independently is $C_{1-20}$ alkyl, specifically $C_{1-8}$ alkyl, $C_{1-20}$ haloalkyl, specifically $C_{1-8}$ haloalkyl, $C_{1-20}$ alkoxy, specifically $C_{1-8}$ alkoxy, $C_{1-20}$ haloalkoxy, specifically $C_{1-8}$ haloalkoxy, halo, —$NH_2$, —$NHR^3$, —$N(R^3)_2$, nitro, cyano, hydroxyl, aryl, heteroaryl, or a combination thereof, wherein $R^3$ is $C_{1-20}$ alkyl, specifically $C_1$ 0.8 alkyl.

The end group EG of formula (II) is an unsubstituted or substituted aryl, specifically unsubstituted or substituted phenyl, wherein the substituted phenyl is substituted with 1, 2, 3, 4, or 5 substituents, wherein each substituent independently is $C_{1-20}$ alkyl, specifically $C_{1-8}$ alkyl, $C_{1-20}$ haloalkyl, specifically $C_{1-8}$ haloalkyl, $C_{1-20}$ alkoxy, specifically $C_{1-8}$ alkoxy, $C_{1-20}$ haloalkoxy, specifically $C_{1-8}$ haloalkoxy, halo, etc.

In an aspect, X of formula (II) or formula (III) is O or $CH_2$.

In an aspect, R of formula (II) or formula (III) is substituted aryl or substituted heteroaryl substituted with 1, 2, or 3 substituents, specifically 1 or 2 substituents, more specifically 1 substituent, and each substituent is independently $C_{1-8}$ alkyl or $C_{1-8}$ haloalkyl. In an aspect, R of formula (II) or formula (III) is 2-substituted phenyl or 3,5-disubstituted phenyl wherein the substitution is $C_{1-6}$ alkyl or $C_{1-6}$ haloalkyl. In an aspect, each R or $R^1$ of formula (II) or formula (III) independently is persubstituted aryl or persubstituted heteroaryl wherein each is persubstituted by a halo, specifically F or Cl.

The dielectric polymer disclosed herein, including those of formula (II) and formula (III) meets one or more of the following parameters:

a.) Tg of greater than or equal to 150° C., specifically about 175 to about 350° C., more specifically about 180 to about 300° C., and yet more specifically about 200 to about 275° C.;

b.) Band gap of greater than or equal to 4.1 eV, specifically about 4.2 to about 5.5 eV, specifically about 4.1, about 4.2, about 4.3, about 4.4, about 4.5, about 4.6, about 4.7, about 4.8, about 4.9, about 5.0, about 5.1, about 5.2, about 5.3, about 5.4, or about 5.5 or any range in between;

c.) a maximum discharged energy density of greater than 5.0 J/cm$^3$ with efficiency at or above 90% at a temperature of 150° C. or 200° C., specifically about 5.5 to about 10 J/cm$^3$, more specifically about 6 to about 9 J/cm$^3$, yet more specifically about 7 to about 8 J/cm$^3$ with efficiency at or above 90% at a temperature of 150° C. or 200° C.;

d.) a maximum discharged energy density of greater than 5.0 J/cm$^3$ at a temperature of 150° C. and an electric field of greater than 650 MV/m or between 650 and 800 MV/m, specifically about 5.5 to about 10 J/cm$^3$, more specifically about 6 to about 9 J/cm$^3$, yet more specifically about 7 to about 8 J/cm$^3$ at a temperature of 150° C. and an electric field of greater than 650 MV/m or between 650 and 800 MV/m;

e.) an operating temperature from about −160 to about 250° C.;

f.) an operating temperature from about −160 to about 225° C.; and g.) an operating temperature from about −160 to about 200° C.

The number average molecular weight ($M_n$) of the dielectric polymer disclosed herein, including those of formula (II) and formula (III), can be in the range of about 15,000 to about 500,000, specifically about 17,500 to about 200,000, and more specifically about 20,000 to about 150,000.

The dielectric polymer disclosed herein may be prepared using a single type of monomer to form a homopolymer, or two or more monomer types in a copolymerization process to form a copolymer.

In an aspect, a dielectric polymer comprises units derived from a monomer according to formula (I)×

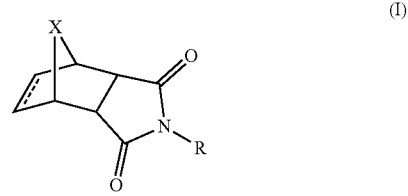

(I)

X is O, S, NR$^1$, C(R$^2$)$_2$, or C(R$^2$)$_2$—C(R$^2$)$_2$ wherein R$^1$ is H, $C_{1-10}$ alkyl, specifically $C_{1-6}$ alkyl, $C_{1-10}$ haloalkyl, substituted or unsubstituted aryl, or substituted or unsubstituted heteroaryl, and each R$^2$ independently is H, halo, or $C_{1-10}$ alkyl, specifically $C_{1-6}$ alkyl, specifically X is O, S, NH, NR$^1$, or CH$_2$, and more specifically X is O or CH$_2$;

------- is a single or double bond;

R is a substituted or unsubstituted aryl or substituted or unsubstituted heteroaryl, wherein each of the substituted aryl and substituted heteroaryl is substituted with 1, 2, 3, 4, or 5 substituents, specifically R is substituted aryl substituted by 1, 2, or 3 substituents.

In an aspect, X of formula (I) is O, S, NH, NR$^1$, or CH$_2$, wherein R$^1$ is unsubstituted or substituted aryl or unsubstituted or substituted heteroaryl, wherein each of the substituted aryl and substituted heteroaryl is substituted with 1, 2, 3, 4, or 5 substituents.

In a further aspect, each substituent on the substituted aryl and substituted heteroaryl of group R or R$^1$ in formula (I) independently is $C_{1-20}$ alkyl, specifically $C_{1-8}$ alkyl, $C_{1-20}$ haloalkyl, specifically $C_{1-8}$ is haloalkyl, $C_{1-20}$ alkoxy, specifically $C_{1-8}$ alkoxy, $C_{1-20}$ haloalkoxy, specifically $C_{1-8}$ haloalkoxy, halo, —NH$_2$, —NHR$^3$, —N(R$^3$)$_2$, nitro, cyano, hydroxyl, aryl, heteroaryl, or a combination thereof, wherein R$^3$ is $C_{1-20}$ alkyl, specifically $C_{1-8}$ alkyl.

In an aspect, X of formula (I) is O or CH$_2$.

In an aspect, R of formula (I) is substituted aryl or substituted heteroaryl substituted with 1, 2, or 3 substituents, specifically 1 or 2 substituents, more specifically 1 substituent, and each substituent is independently $C_{1-8}$ alkyl or $C_{1-8}$ haloalkyl.

In an aspect, R is a substituted or unsubstituted aryl or substituted or unsubstituted heteroaryl, wherein each of the substituted aryl and substituted heteroaryl is substituted with 1, 2, 3, 4, or 5 substituents, specifically R is substituted aryl, more specifically R is 2-substituted phenyl or 3,5-disubstituted phenyl wherein the substitution is $C_{1-6}$ alkyl or $C_{1-6}$ haloalkyl. In an aspect, R of formula (I) is persubstituted aryl or persubstituted heteroaryl wherein each is persubstituted by a halo, specifically F or Cl.

The dielectric polymers of formula (II) may be prepared by conducting Ring Opening Metathesis Polymerization (ROMP) or the polymers of formula (III) may be prepared by vinyl addition polymerization using a monomer of formula (I) as previously described herein. The processes can be conducted in the presence of an appropriate solvent. Suitable solvents include organic solvents, including halogenated solvents such as methylene chloride, chloroform, 1,2-dichloroethane, chlorobenzene, and the like, and non-halogenated solvents such as toluene, and the like. The Ring Opening Metathesis Polymerization can be conducted using Grubb's second generation catalyst or other suitable ROMP catalyst. The vinyl addition polymerization can be conducted using a suitable transition-metal catalyst. Suitable transition-metal catalysts include those of Ti, Cr, Fe, Co, Ni, Pd and Cu with methylaluminoxane or perfluorinated borane (e.g. $B(C_6F_5)_3$, and their use with co-catalysts.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, "—CHO" is attached through carbon of the carbonyl group.

Unless otherwise indicated, the term "substituted" as used herein means replacement of one or more hydrogens with one or more substituents. Suitable substituents include, for example, hydroxyl, $C_6$-$C_{12}$ aryl, $C_3$-$C_{20}$ cycloalkyl, $C_1$-$C_{20}$ alkyl, halogen, $C_1$-$C_{20}$ alkoxy, $C_1$-$C_{20}$ alkylthio, $C_1$-$C_{20}$ haloalkyl, $C_6$-$C_{12}$ haloaryl, pyridyl, cyano, thiocyanato, nitro, amino, $C_1$-$C_{12}$ alkylamino, $C_1$-$C_{12}$ aminoalkyl, acyl, sulfoxyl, sulfonyl, amido, or carbamoyl.

As used herein, "alkyl" includes straight chain, branched, and cyclic saturated aliphatic hydrocarbon groups, having the specified number of carbon atoms, generally from 1 to about 20 carbon atoms, greater than 3 for the cyclic. Alkyl groups described herein typically have from 1 to about 20, specifically 3 to about 18, and more specifically about 6 to about 12 carbons atoms. Examples of alkyl include, but are not limited to, methyl, ethyl, n-propyl, isopropyl, n-butyl, 3-methylbutyl, t-butyl, n-pentyl, and sec-pentyl. As used herein, "cycloalkyl" indicates a monocyclic or multicyclic saturated or unsaturated hydrocarbon ring group, having the specified number of carbon atoms, usually from 3 to about 10 ring carbon atoms. Monocyclic cycloalkyl groups typically have from 3 to about 8 carbon ring atoms or from 3 to about 7 carbon ring atoms. Multicyclic cycloalkyl groups may have 2 or 3 fused cycloalkyl rings or contain bridged or caged cycloalkyl groups. Examples of cycloalkyl groups include cyclopropyl, cyclobutyl, cyclopentyl, or cyclohexyl as well as bridged or caged saturated ring groups such as norbornane or adamantane.

As used herein "haloalkyl" indicates both branched and straight-chain alkyl groups having the specified number of carbon atoms, substituted with 1 or more halogen atoms, generally up to the maximum allowable number of halogen atoms ("perhalogenated"). Examples of haloalkyl include, but are not limited to, trifluoromethyl, difluoromethyl, 2-fluoroethyl, and penta-fluoroethyl.

As used herein, "alkoxy" includes an alkyl group as defined above with the indicated number of carbon atoms attached through an oxygen bridge (—O—). Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

"Haloalkoxy" indicates a haloalkyl group as defined above attached through an oxygen bridge.

The term "heterocycloalkyl" is used to indicate a non-aromatic, monocyclic or multicyclic saturated or unsaturated hydrocarbon ring group containing from 1 to about 3 heteroatoms chosen from N, O, and S, with remaining ring atoms being carbon. Monocyclic heterocycloalkyl groups have from 3 to about 8 ring atoms, and more typically have from 5 to 7 ring atoms. A $C_2$-$C_7$ heterocycloalkyl group contains from 2 to about 7 carbon ring atoms and at least one ring atom chosen from N, O, and S. Multicyclic heterocycloalkyl groups may have 2 or 3 fused rings or contain bridged or caged groups. Examples of heterocycloalkyl groups include morpholinyl, piperazinyl, piperidinyl, and pyrrolidinyl groups.

As used herein, the term "aryl" indicates aromatic groups containing only carbon in the aromatic ring or rings. Such aromatic groups may be further substituted with carbon or non-carbon atoms or groups. Typical aryl groups contain 1 or 2 separate, fused, or pendant rings and from 6 to about 12 ring atoms, without heteroatoms as ring members. Where indicated aryl groups may be substituted. Such substitution may include fusion to a 5 to 7-membered saturated cyclic group that optionally contains 1 or 2 heteroatoms independently chosen from N, O, and S, to form, for example, a 3,4-methylenedioxy-phenyl group. Aryl groups include, for example, phenyl, naphthyl, including 1-naphthyl and 2-naphthyl, and bi-phenyl.

As used herein "heteroaryl" indicates aromatic groups containing carbon and one or more heteroatoms chosen from N, O, and S. Exemplary heteroaryls include oxazole, pyridine, pyrazole, thiophene, furan, isoquinoline, and the like. The heteroaryl groups may be substituted with one or more substituents.

As used herein, "halo" or "halogen" refers to fluoro, chloro, bromo, or iodo.

Polyolefins such as PE or PP are generally used polymers for high electric field application owing to their large bandgap. However, some electronic devices get exposed to high temperatures during their operation and require high electric field stability simultaneously. These applications require materials to be stable at harsh conditions. Unfortunately, currently used polymers with high electric field stability have low operating temperature because of their low Tg or Tm, limiting their use at elevated temperatures. On the other hand, present high temperature polymers with high thermal stability show noticeable electrical conduction or conduction losses at ambient and/or elevated temperatures. So, there is a gap between polymers having high thermal stability and polymers having high electric field stability.

Glass transition temperature is one measure of polymer thermal stability. High glass transition temperature is necessary for polymers to operate at higher temperature, as near glass transition temperature polymers can lose their mechanical integrity. Common high temperature polymers have their high Tg or high thermal stability built by incorporating a large number of aromatic groups in the polymer backbone. These aromatic groups lead to lowering the polymer band gap, and hence prominent electrical conduction is observed when electric field is applied. There is an inverse co-relation between Tg and bandgap for common high Tg polymers which indicates that incorporating more number aromatic groups to improve the Tg results in lowering the polymer bandgap. Great efforts have been made to suppress the electrical conduction of high temperature polymers by making composites or coating these common high temperature polymers with large bandgap inorganic materials. Though there is appreciable suppression in the electrical conduction, this approach results in flexibility, processability as well as performance issues at high electric fields. Compromising the flexibility and processability to achieve desired electrical properties is not adequate as these parameters are important for real-life applications. On the other hand, polymers having high electric field stability are composed of aliphatic polymer backbone. Absence of any aromatic moieties in the polymer backbone delivers high bandgap as there is no pi-pi stacking available. Though aliphatic polymer backbone gives large bandgap, lack of aromatic moieties in the polymer structures results in poor thermal stability. Hence, these aliphatic polymers cannot be used for high temperature application.

Disclosed herein is a flexible, processable polymer having high electric field and high temperature stability simultaneously. Taking structure design of aliphatic and aromatic polymers, these novel polymers are prepared with a polymer design where high temperature and high bandgap are achieved simultaneously. As per the structural design of large bandgap polymers, aliphatic groups are incorporated in the polymer backbone to reduce the conjugation length as well as to minimize the pi-pi stacking to achieve a large bandgap. To improve the thermal stability aromatic groups are incorporated as a side group rather than in the polymer backbone. In one aspect, exemplary polymer structures developed using this strategy are shown in Scheme 1, which are a series of polyoxonorbornylenes prepared using ROMP.

Scheme 1.

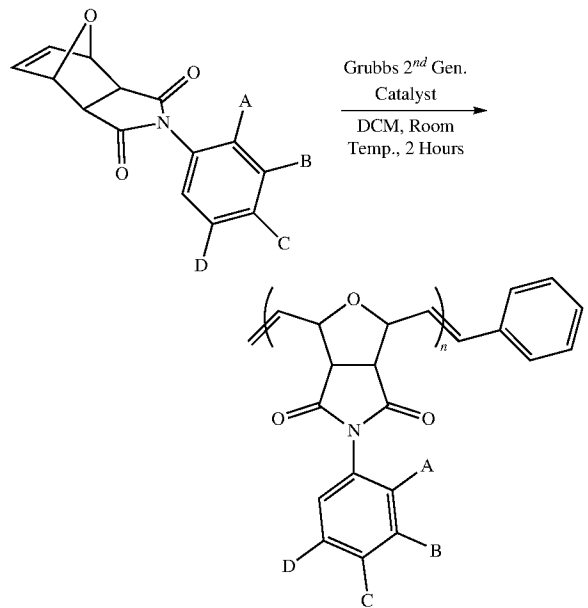

TABLE 1

| Polymer | A | B | C | D | Tg (° C.) |
|---|---|---|---|---|---|
| POFNB | H | —CF$_3$ | H | —CF$_3$ | 186 |
| m-POFNB | H | H | H | —CF$_3$ | 176-178 |
| p-POFNB | H | H | —CF$_3$ | H | 220-222 |
| o-POFNB | —CF$_3$ | H | H | H | 244-245 |
| PONB | H | H | H | H | 228 |

The polymers of Scheme 1/Table 1 do not follow the previously mentioned Tg versus bandgap trend unlike in other high temperature polymers as they show high Tg as well as high bandgap simultaneously (FIG. 1, PAI=polyamideimide, PC=polycarbonate, PEEK=polyether ether ketone, PEI=polyetherimide, PEN=polyethylene naphthalate, PET=polyethylene terephthalate, and PI=polyimide).

One such polymer POFNB has a high Tg of 186° C. and high bandgap of 4.9 eV (FIG. 1). Polymers mentioned in Scheme 1 are synthesized using a ring opening metathesis polymerization technique which provides a large platform for modification and improvement of polymer electrical properties through structural design.

In one aspect, disclosed are polymer materials of novel composition prepared by Ring Opening Metathesis Polymerization and by vinyl addition polymerization to produce dielectric polymers having extremely high breakdown over a broad operating temperature range (−160 to 170° C. or greater). It has been found that a class of polyolefins, namely polyoxonorbornylenes, with a more rigid backbone, and containing rigid side groups leads to enhancement of the dielectric constant, enhancement of Tg, and a tremendous enhancement in the polymer temperature operating range, with loss values equitable to BOPP, but with a much higher energy density especially at higher operating temperatures.

Figure 2:
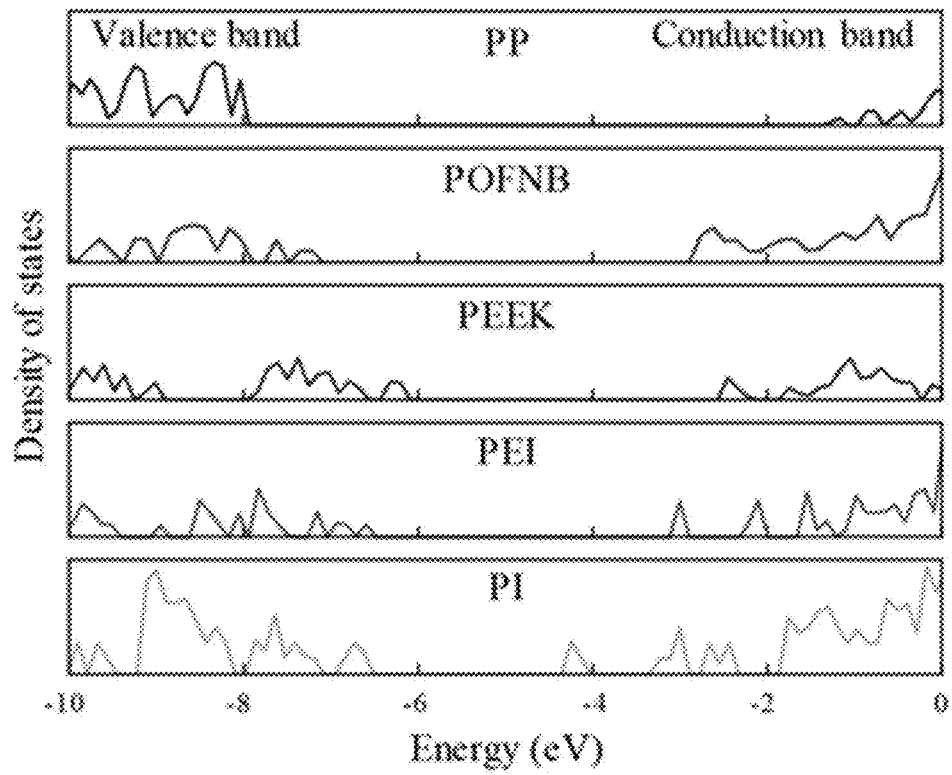
FIG. 2 The electronic density of states of POFNB, PP, PI, PEI, and PEEK.

As shown in Scheme 1, POFNB polymer is modified by changing the —CF$_3$ substitution on the benzene ring. The one —CF$_3$ substitution is placed at different positions of the benzene ring and the resulting polymers were studied for structural as well as for electrical properties. Out of these polymers o-POFNB shows highest glass transition temperature of 244° C., showing about 70° C. increment compared to POFNB. Most importantly this increment in glass transition temperature is achieved without compromising the polymer bandgap (FIG. 1). FIG. 2 illustrates the electronic density of states of POFNB, PP, PI, PEI, and PEEK.

Figure 3:
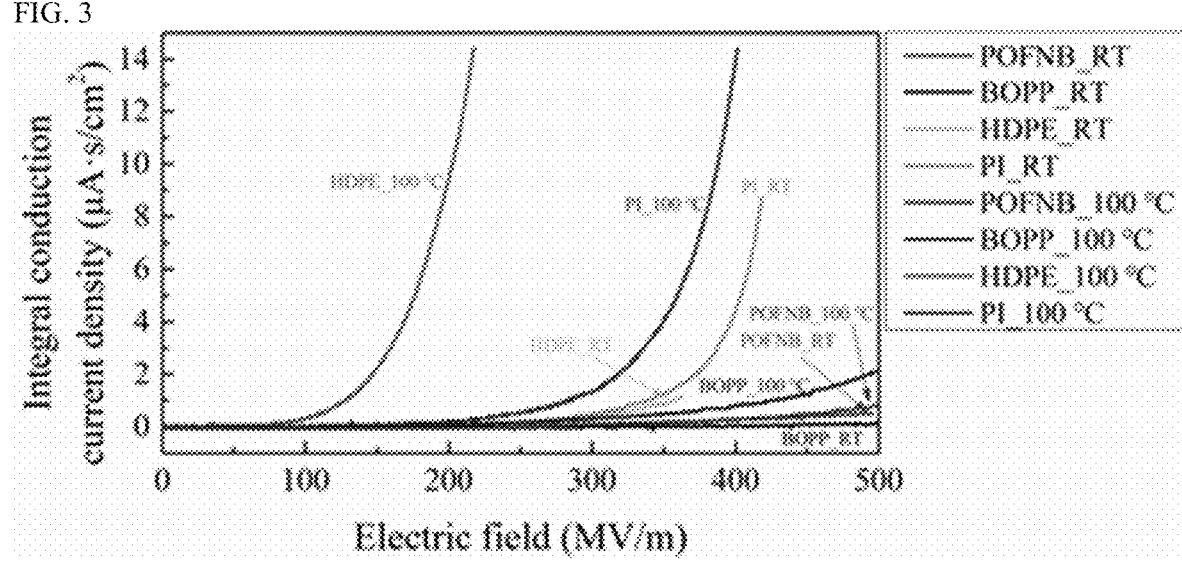
FIG. 3 Integral conduction current density as a function of electric field for polymer films of POFNB, o-POFNB, and conventional high temperature and insulating polymers.
Figure 4:
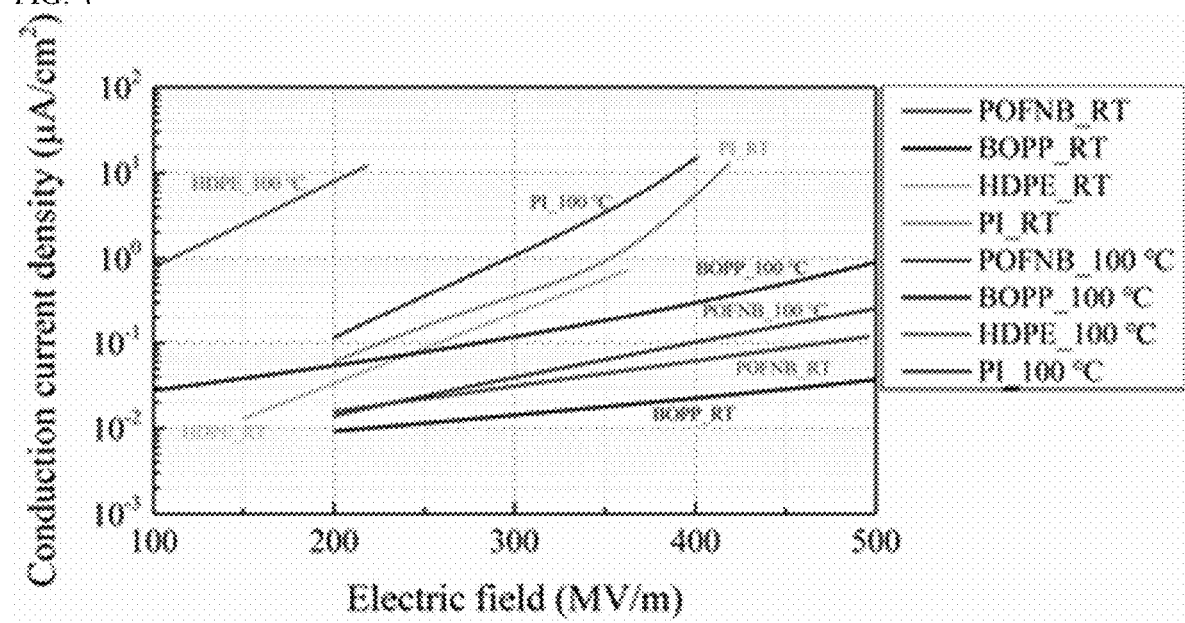
FIG. 4 Conduction current density as a function of electric field for polymer films of POFNB, o-POFNB, and conventional high temperature and insulating polymers.

To reveal the electrical insulation properties, polymers films of POFNB and o-POFNB along with other high temperature polymers as well as insulating polymers were characterized for conduction current measurements (FIG. 3 and FIG. 4; HDPE=high-density polyethylene). Here, high field conduction was measured using a designed system which can dynamically cancel the capacitive component and probe the conduction current down to 10 ppm during the voltage ramp all the way to breakdown. From integral conduction current (ICC) it can be seen that BOPP i.e. commercially available dielectric material shows lowest ICC followed by POFNB. While PI shows highest conduction current due to its low bandgap. However, at 100° C. POFNB shows lowest conduction current while BOPP shows higher ICC than POFNB as a result of low thermal stability of BOPP. HDPE shows highest ICC at 100° C. and surpasses PI, again due to low thermal stability of HDPE.

An example where polymers need to have high electric field and temperature stability is a high energy density capacitor. In energy storage capacitors polymer film is used as a dielectric material and placed between two conductive plates where energy is stored electrostatically upon application of electric field. This stored energy is released during the operation. Applications such as electric and aerospace vehicles, oil and gas lodging instruments and also because of heat generated by power processing devices during operation, capacitors need to operate at temperatures higher than the ambient temperature. The energy stored in capacitor depends on the dielectric constant and electric field applied or materials breakdown strength as per the following equation $$Ue = \frac{1}{2}\varepsilon E^2$$

where $\varepsilon$ is dielectric constant of the material used and E is applied electric field or materials breakdown strength. It is clear from the equation that polymer's stability at higher electric field plays crucial role in capacitors total energy storage. Another important parameter for capacitors is their efficiency which tells about the difference between total energy stored and total energy released during the operation. Two main factors influencing the energy loss are dissipation factor and conduction losses. Materials breakdown strength or stability at high electric field is important to control the conduction losses. Especially at elevated temperatures polymers exhibit nonlinear increase in electrical conduction due to hot carrier excitation, injection and transport which leads to increase in total energy loss.

Earlier studies have mentioned that high bandgap materials are necessary for suppressing the electrical conduction hence to get a high discharged energy density with high efficiency. Polymer POFNB, developed using above mentioned design strategy shows record high energy density of 5.7 J/cc at 150° C. with high efficiency. This reported polymer has backbone made up of saturated aliphatic rings and alternate double and single bonds. To this polymer backbone, a substituted aromatic benzene ring is attached through an imide linkage extended from a saturated cyclic five-member ring. Here, backbone double bonds, cyclic ring as well as aromatic side groups help in maintaining the structural rigidity and hence the high glass transition temperature. Absence of aromatic groups in the polymer backbone benefits in achieving high bandgap, unlike in common high temperature polymers. Analogs of POFNB, namely, o-POFNB, m-POFNB, p-POFNB and PONB (Scheme 1, Table 1) were synthesized and characterized for energy storage application. The polymers are high temperature all organic polymers and o-POFNB has a record high energy density at 150° C. and at 200° C.

To reveal the true energy storage parameters as well as efficiency of a polymer as a dielectric material, polymers were characterized using dielectric displacement-electric field (DE) loop test. The narrow region between charging and discharging cycle of the DE loop indicates low energy loss. DE loop analysis was performed on polymer films of 10-13 microns. From D-E loop analysis it can be seen that at ambient temperature, polymer with one —$CF_3$ substitution at meta position i.e. m-POFNB gives maximum discharged energy density of 8.8 J/cc. At 150° C. m-POFNB has discharged energy density of 7.44 J/cc with 70% efficiency (SI). Similarly, for o-POFNB at room temperature the maximum discharged energy density obtained is 10.4 J/cc (SI) with an efficiency of >90%, which is a highest energy density when compared with polymers mentioned in this study. At 150 and 200° C. the maximum discharged energy density values for o-POFNB are 8.3 J/cc with 83% efficiency (FIG. 5) and 6.5 J/cc with 81% efficiency respectively (FIG. 6) owing to its high breakdown strength. As per our knowledge, there is no other flexible polymer or polymer composite reported with energy density value greater than that of o-POFNB at 150° C. and 200° C. with such a high efficiency.

For polymer dielectrics it is necessary to have high discharged density with high efficiency. The discharge energy density value with efficiency at and above 90%, especially at elevated temperatures is of importance for practical applications. For o-POFNB the discharged energy density obtained for about 90% efficiency at 150° C. is around 6.0 J/cc outperforming all the reported high temperature polymer or polymer composite dielectrics. Even at 200° C. the discharged energy density with about 90% efficiency is around 2.3 J/cc, the highest ever discharged energy density obtained so far for any dielectric material with high efficiency and at such a high temperature. In case of m-POFNB at 150° C. the discharged energy density for 90% efficiency is around 2 J/cc and it could not be tested at 200° C. because of its low Tg of 176-178° C. The low efficiency of m-POFNB could be due to enhanced polarization losses as well as low difference between testing temperature and the polymer glass transition temperature.

Table 2 reports the energy density with about 90% or >90% efficiency for o-POFNB at 25° C., 100° C., 150° C., and 200° C.

TABLE 2

|  | 25° C. | 100° C. | 150° C. | 200° C. |
| --- | --- | --- | --- | --- |
| Energy Density (J/cc) | about 10.6 | about 9.8 | about 6.0 | about 2.3 |

Table 3 reports a comparison of discharged energy density of o-POFNB with best reported high temperature polymers or polymer composites at above 90% efficiency at 200° C.

TABLE 3

|  | o-POFNB | c-BCB/$Al_2O_3$ | PEI/h-Bn* | c-BCB/BNNS^ |
| --- | --- | --- | --- | --- |
| Energy Density (J/cc) | about 2.3 | about 1.4 | about 1.2 | about 0.6 |

*Hexagonal boron nitride = h-Bn
^Boron nitride nanosheets = BNNS

Figure 7:
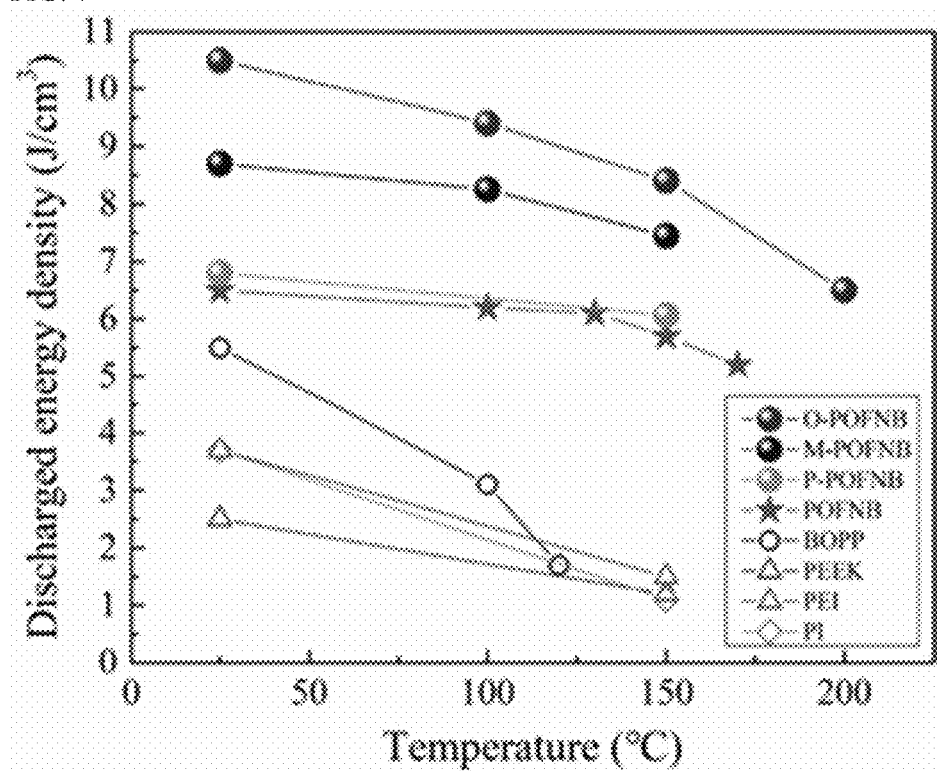
FIG. 7 reports discharged energy density as a function of temperature for POFNB-type polymers as well as common high temperature polymers.

FIG. 7 reports discharged energy density as a function of temperature for POFNB-type polymers as well as other common high temperature polymers. As revealed in the graph, the POFNB-type polymers exhibit significantly increased discharged energy density over a wide and elevated temperature range.

Figure 8:
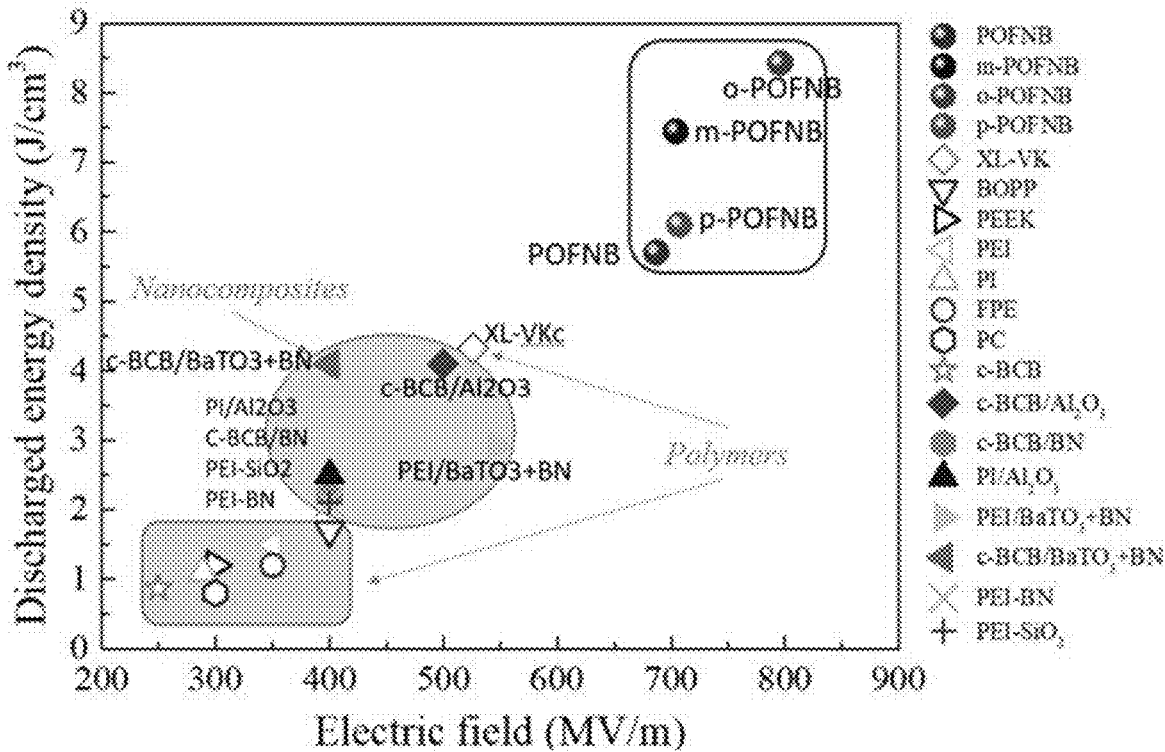
FIG. 8 reports the maximum discharged energy density of POFNB-type polymers and other best reported dielectric polymers at 150° C. as a function of applied electric field.

FIG. 8 reports the maximum discharged energy density of POFNB-type polymers and other best reported dielectric polymers at 150° C. as a function of applied electric field (c-BCB=benzocyclobutene polymer composite, BN=boron nitride, FPE=fluorene polyester, and XL-VK=crosslinked poly(chlorotrifluoroethylene-co-vinylidene fluoride) (Li et al. Energy Environ. Sci., 2020, 13, 1279-1286).

Figure 9:
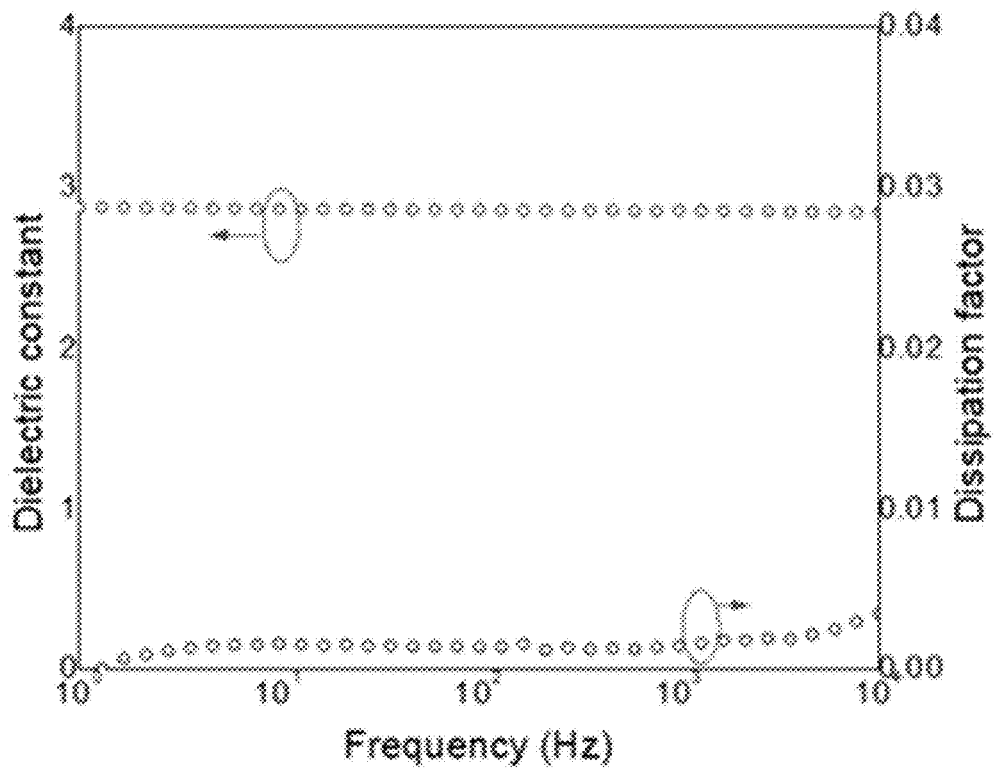
FIG. 9 dielectric spectroscopy results for o-POFNB.

Though electrical conduction is a major cause of the energy loss especially at elevated temperatures, it is also important to control the dielectric losses as well. Dielectric loss is measured using dielectric spectroscopy for a wide temperature and frequency range. From dielectric spectroscopy of o-POFNB it is observed that, o-POFNB shows very low dielectric loss for large temperature and frequency range (FIG. 9). In o-POFNB polymer structure —$CF_3$ attached benzene ring is a main group controlling the dielectric constant (SI). The aromatic benzene ring in the polymer structure is attached to 'N' of the imide group in such a way that there is no cross conjugation between the benzene and nitrogen. The lone pair of 'N' are in conjugation with imide oxygens, which does not allow cross conjugation between 'N' and benzene ring and avoids possibility of having system with partial double bonds. This makes temperature independent rotation of —$CF_3$ attached benzene ring and results in stable dielectric constant with low loss for large temperature and frequency range. This design features are helpful for developing polymers with low dielectric loss for large temperature range. POFB itself shows stable dielectric constant of 2.2 with low loss for temperature range of −160° C. to 160° C. Removal of one —$CF_3$ group results in low free volume in polymers synthesized in this study. This causes increase in total dipole density hence increase in the dielectric constant compared to POFNB itself. Also, presence of —$CF_3$ group in asymmetric manner helps in increasing the dielectric constant of o-POFNB and m-POFNB. However, the rotation of the —$CF_3$ attached benzene in o-POFNB is much restricted due to position of the —$CF_3$ group at ortho position, while in m-POFNB the rotation is less restricted. This results in m-POFNB having dielectric constant of 3.3 while o-POFNB has dielectric constant of 3.00. Ease of rotation of dipole in the m-POFNB helps in improving the dipolar polarization which causes total increase in dielectric constant, however, this enhanced dipolar polarization also causes increase in dielectric losses with varying temperature and frequency.

Position of the —$CF_3$ group plays a role in deciding structural properties such as glass transition temperature. PONB with no —CF3 group attached has glass transition temperature of 230° C. High glass transition temperature of PONB is observed because of the rigidity in the polymer structure. The polymer chains are close to each other as there in no —CF3 groups for steric hindrance. Because of this rigidity polymer film obtained from PONB is brittle in nature and cannot be characterized for electrical properties. Incorporation of —CF3 group imparts flexibility and hence other polymers give flexible free-standing films. The restricted freedom of rotation in o-POFNB helps in improving the glass transition temperature (244° C.) compared to other polymers. More symmetric repeat unit of p-POFNB results in higher glass transition temperature (228° C.) than POFNB. Whereas ease of rotation as well as asymmetric substitution of —CF3 in m-POFNB contributes to lower Tg of 178° C.

For developing insulating materials or high energy density materials focus need to be shifted on local structural details of the polymers. For common high temperature polymers their rigidity is maintained because of the aromatic groups as well as large number of conjugation or cross conjugation present in the polymer backbone. The presence of conjugation/cross conjugation develops partial double character throughout the backbone which restricts the local motions of polymer structure. These restrictions result in change in response with varying temperature or frequency. The polymer prepared by ring opening metathesis polymerization described herein have structures where there is no such moiety present which can put restriction on rotation of molecules. The double bonds and single bonds are placed in alternate manner. Because of these single bonds, the fused bicyclic group along with the side group attached to it can have movement around the axis. The structure is analogous to a piston attached to crankshaft where the backbone fused cyclic ring with the side group serves as a connecting rod and a piston. The single bonds, meanwhile, move like a crankshaft. This intra repeat unit of flexible and rigid domains make polymer efficient under a large temperature range as well as under high electric fields from a dielectric energy storage point of view. This structural concept can be used in other polymer systems and result in advancement of next generation polymer dielectrics. Further elaboration of the structural concept is described herein. From D-E loop analysis it is observed that, presence of —$CF_3$ group at ortho position results in higher breakdown strength, compared to other polymers at every testing temperature even though all the polymers have band gaps in the same range. Not wishing to be bound by theory, the possible reason for this is the difference between the testing temperature and glass transition temperature coupled with high band gap. Another possible reason is, o-POFNB has optimized combination of flexibility and rigidity as described, hence results in higher breakdown strength.

The POFNB and POFNB-type polymers reported herein are all organic polymer material with suppressed electrical conduction and record high discharged energy density at elevated temperatures. Inspired from design structures of polymers with high electric field stability and polymers with high thermal stability new polymer design system is developed where both high electric field and high temperature stability is achieved simultaneously. Wide bandgap, freely rotatable structural groups along with combination of flexible and rigid moieties, achieved through molecular engineering approach results in polymer dielectric with discharged energy density of 6.5 J/cc at 200° C. UV-Vis spectroscopy, ICC measurements, D-E loop analysis along with DFT and simulation study reveals the insulating and energy storage properties of reported polymers.

Energy is of prime importance to the future of military and generally, society. Energy needs to be stored—and high energy density capacitors meet the high demand of electric vehicles, weapons, and launching procedures that can take place in the presence or absence of atmospheric oxygen. −160° C. meets the low temperature experienced on the moon and Mars, while 170° C. meets the demand for electric vehicles, rail guns, etc.

For polymers to have high breakdowns in excess of 500 MV/m, the polymers are to be very pure. Processing requirements require polymer films having very low surface roughness.

Further, to have very broad operating temperature range, and especially operation at the two extremes of temperature, these materials are to have a high thermal glass transition temperature, meaning they have to be a glass between −160 and 170° C. or greater with no thermal transitions (including glass, melt, liquid crystal, etc.). Other requirements faced by these polymers is that for large scale processing, melt procedures are used as opposed to solution casting. Hence, these materials, apart from being amorphous, would need to be semicrystalline glasses wherein the percent crystallinity will need to be controlled. The heteroatom in the backbone need not just be oxygen but could extend to be nitrogen as well as sulfur. Disclosed herein are a series of polyoxonorbornylenes (glass) and polyoxonorbornanes (semicrystalline) that meet the requirements indicated.

The polyoxonorbornylenes and polyoxonorbornanes, their sulfur analogs, and nitrogen analogs, can be made with various side groups that will allow for boosting dielectric constant and can be made using a small amount of catalyst, allowing for the polymer to be purified easily. These polyolefins can be solution or melt processed and their synthesis is scalable.

A further advantage of the polymers disclosed herein over BOPP, is that they are easily functionalized. By changing, for example, the functionalization by way of halogenation, specifically fluorination of the side groups, use of polar groups, use of rigid groups, and the like, the properties of the polymer can be tuned.

In an aspect, a composition comprises a dielectric polymer as described herein, including a polymer of formula (II).

In another aspect, an article comprises a dielectric polymer as described herein, including a polymer of formula (II) or a composition comprising the polymer.

Design Strategy for Polymer Dielectrics Having High Tg and High Bandgap

Disclosed herein is a design strategy to develop all organic polymers having high Tg, high bandgap, and a wide operating temperature (e.g., about −160 to about 170° C. or greater). Conventional high-performance polymer dielectrics generally have conjugated aromatic backbones, leading to limited bandgaps and hence high conduction loss and poor energy densities, especially at elevated temperatures.

As shown for the ROMP polymers, discussed above, the polymer backbone is free of aromatic groups. Rather, aliphatic groups are incorporated in the polymer backbone to reduce the conjugation length as well as to minimize the pi-pi stacking to achieve a large bandgap. The ROMP prepared polymers have a backbone of alternating double bonds, single bonds, and a fused bicyclic group. Longer range sterics plays a significant role in the rotational energy barrier. Because of the single bonds in the ROMP polymers, the fused bicyclic group along with the side group attached to it can have movement around the axis. This conformational freedom within the persistence length of the polymer backbone is important for high temperature dielectric operation. A polymer backbone without aromatic groups and conjugation gives high band gap and freely rotatable single bonds between rigid components. The presence of rigid and soft segments provides stable dielectric constant (Dk) and low loss at wide temperature and frequency range. To improve the thermal stability, aromatic groups are incorporated as a side group rather than in the polymer backbone. Again, turning to the ROMP prepared polymers, a phenyl group is attached to the fused bicyclic group. The aromatic phenyl improves the polymer thermal stability, while substitution on this phenyl group allows for tuning of the properties of the polymer.

Figure 10:
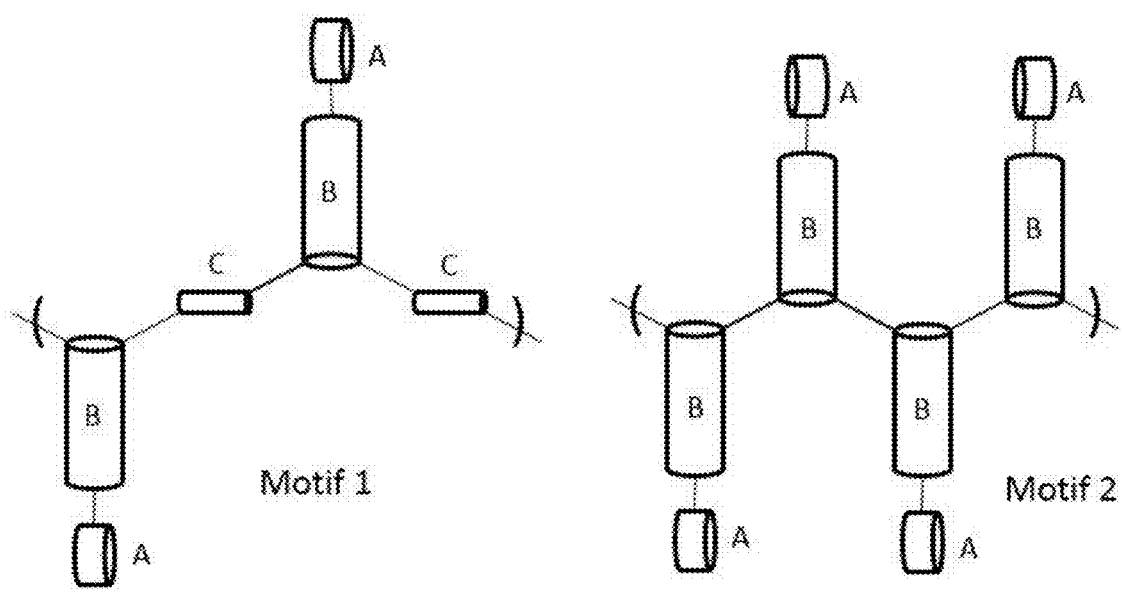
FIG. 10 Motifs of polymer dielectrics having high Tg and high bandgap based on design strategy.

FIG. 10 shows two motifs for the described design strategy. Motif 1 is a model of a polymer structure having repeat units of a first rigid domain (B) separated by single bonds and a second rigid domain (C) in the polymer backbone. Because of the single bonds separating these rigid domains, there can be movement around the axis of the polymer. An aromatic group (A) is a pendent group attached to the first rigid domain (B). The aromatic group (A) is linked to the first rigid domain (B) through a single bond, which allows for rotation of the aromatic group. By modifying the substituents and substituent pattern on the aromatic group (A), the glass transition temperature and electrical properties of the polymer can be modified. For example, attachment of a substituent ortho to the attachment of the imide group on the aromatic will restrict the rotation of the benzene ring, and this restricted rotation will limit long range segmental motion thereby increasing Tg. A substituent meta with respect to the point of attachment will have less restriction of movement and a lower restriction thereby resulting in a lower Tg. The lowest Tg will be placement of a substituent at the para position in which free rotation of the benzene ring will occur resulting in the lowest Tg for a mono-substituted aromatic. As multiple groups are added, a substituent or substituents located ortho to the point of attachment to the imide group will result in the highest Tg values. If neither or none of the substituents are located on the ortho positions, the Tg will be lower.

The POFNB and POFNB-type polyoxafluoronorbornene polymers discussed herein are consistent with Motif 1, which have a design feature that is a polyolefin having repeating units of fairly rigid fused bicyclic structures corresponding to first rigid domain (B) and alkenes corresponding to second rigid domains (C) separated by freely rotating single bonds. This design results in a polymer exhibiting a large bandgap and flexibility, while being temperature-invariantly stable over −160 to 160° C. or greater. The optionally substituted phenyl (C) linked to the first rigid domain (B) through a single bond imparts thermal stability to the polymer.

Motif 2 of FIG. 10 is a model of a polymer structure having repeat units of first rigid domain (B) separated by single bonds in the polymer backbone. An aromatic group (A) is a pendent group attached to the first rigid domain (B). As in Motif 1, the aromatic group (A) is linked to the first rigid domain (B) through a single bond, which allows for rotation of the aromatic group.

In both Motif 1 and Motif 2, the intra repeat unit of flexible and rigid domains make the polymer efficient under a large temperature range as well as under high electric fields from a dielectric energy storage point of view. The aromatic pendent groups provide thermal stability to the polymer and is an easily modifiable structure for the design and development.

In an aspect, a dielectric polymer comprises a polymer backbone and a pendent group, the polymer backbone comprises alternating repeat units of a first rigid domain separated by single bonds or the polymer backbone comprises alternating repeat units of a first rigid domain and a second rigid domain separated by single bonds, wherein the pendent group is an optionally substituted aromatic group attached to the first rigid domain by a single bond. The dielectric polymer with the foregoing design meets one or more of the following:

a.) Tg of greater than or equal to 150° C., specifically about 175 to about 350° C., more specifically about 180 to about 300° C., and yet more specifically about 200 to about 275° C.;

b.) Band gap of greater than or equal to 4.1 eV, specifically about 4.2 to about 5.5 eV, specifically about 4.1, about 4.2, about 4.3, about 4.4, about 4.5, about 4.6, about 4.7, about 4.8, about 4.9, about 5.0, about 5.1, about 5.2, about 5.3, about 5.4, or about 5.5 or any range in between;

c.) a maximum discharged energy density of greater than 5.0 J/cm$^3$ with efficiency at or above 90% at a temperature of 150° C. or 200° C., specifically about 5.5 to about 10 J/cm$^3$, more specifically about 6 to about 9 J/cm$^3$, yet more specifically about 7 to about 8 J/cm$^3$ with efficiency at or above 90% at a temperature of 150° C. or 200° C.;

d.) a maximum discharged energy density of greater than 5.0 J/cm$^3$ at a temperature of 150° C. and an electric field of greater than 650 MV/m or between 650 and 800 MV/m, specifically about 5.5 to about 10 J/cm$^3$, more specifically about 6 to about 9 J/cm$^3$, yet more specifically about 7 to about 8 J/cm$^3$ at a temperature of 150° C. and an electric field of greater than 650 MV/m or between 650 and 800 MV/m;

e.) an operating temperature from about −160 to about 250° C.;

f.) an operating temperature from about −160 to about 225° C.; and g.) an operating temperature from about −160 to about 200° C.

Suitable examples of the first rigid domain include a cycloalkyl or heterocycloalkyl group which makes up the polymer backbone, specifically a multicyclic cycloalkyl or a multicyclic heterocycloalkyl group, more specifically a fused or bridged cycloalkyl or heterocycloalkyl ring system, and yet more specifically a fused and/or bridged bicyclic or tricyclic cycloalkyl or heterocycloalkyl ring system, and the like.

Suitable examples of the second rigid domain include ethylene (—CH═CH—), ethyne (—C≡C—), and the like. In those embodiments having ethylene, the polyolefins can be prepared with particular cis:trans ratios, which may be used to modify the dielectric properties of the resulting polymer.

Suitable examples of the aromatic group includes substituted or unsubstituted aryl, substituted or unsubstituted heteroaryl, wherein each of the substituted aryl and substituted heteroaryl is substituted with 1, 2, 3, 4, or 5 substituents. In a further aspect, each substituent on the substituted aryl and substituted heteroaryl independently is $C_{1-20}$ alkyl, specifically $C_{1-8}$ alkyl, $C_{1-20}$ haloalkyl, specifically $C_{1-8}$ haloalkyl, $C_{1-20}$ alkoxy, specifically $C_{1-8}$ alkoxy, $C_{1-20}$ haloalkoxy, specifically $C_{1-8}$ haloalkoxy, halo, $-NH_2$, $-NHR^3$, $-N(R^3)_2$, nitro, cyano, hydroxyl, aryl, or heteroaryl, wherein $R^3$ is $C_{1-20}$ alkyl, specifically $C_{1-8}$ alkyl. In one aspect, the aryl is phenyl or substituted phenyl, specifically phenyl substituted at the 2-position, naphthyl or substituted naphthyl, phenanthrene or substituted phenanthrene, pyrene or substituted pyrene, and the like. In one aspect the heteroaryl is pyridine or substituted pyridine, quinoline or substituted quinoline, thiophene or substituted thiophene, furan or substituted furan, pyrrole or substituted pyrrole, indole or substituted indole, wherein each substituted heteroaryl is substituted with 1, 2, or 3 substituents as described herein.

The dielectric polymer materials disclosed herein can be used in high energy density capacitors such as those used for the rail gun (BAE Systems), electric cars, electrocatapults, and potentially electric jets, and the like. These materials can be used in capacitors where an extreme energy burst would be required, for acceleration and launches, for example. These polymers have high electric field stability are thus are useful for applications such as insulation of cable wires, energy storage devices, and organic field-effect transformers.

The polymers disclosed herein can be used for better understanding of temperature dependent electrical conduction phenomenon in insulating polymers at elevated temperatures.

The insulating polymers disclosed herein are high-temperature insulating polymers with high discharged energy density without the addition of inorganic fillers. These polymers free from any inorganic materials exhibit flexibility and ease of processing which makes them adaptable with large numbers of electrical and electronic applications with electrical and thermal extremes. It is contemplated that such polymers may optionally be combined with an organic or inorganic filler to form a polymer composite or polymer nanocomposite. The inorganic filler can be, for example, $BaTiO_3$, PMN-PT (65/35) 65% Lead magnesium niobate and 35% Lead titanate. $PbNb_2O_6$, PLZT (7/60/40) Lead lanthanum zirconium titanate, $SiO_2$, $Al_2O_3$, $Ta_2O_5$, $TiO_2$, $SrTiO_3$, $ZrO_2$, $HfO_2$, $HfSiO_4$, $La_2O_3$, $Y_2O_3$, alpha-$LaAlO_3$, $CaCu_3Ti_4O_{12}$, $La_{1.8}Sr_{0.2}NiO_4$, boron nitride, hexagonal boron nitride, boron nitride nanosheets, or a combination thereof.

The following illustrative examples are provided to further describe the invention and are not intended to limit the scope of the claimed invention.

EXAMPLES

Material

Exo-3,6-Epoxy-1,2,3,6-tetrahydrophthalic anhydride (Oxanorbornene anhydride), anhydrous toluene, ethyl ether, dichloromethane (DCM), tetrahydrofuran (THF), methanol, and acetic anhydride were purchased from Fisher Scientific. Anhydrous sodium acetate and 3,5-Bis(trifluoromethyl)aniline were purchased from Oakwood Chemicals. Grubbs generation 2 catalyst was purchased from Sigma-Aldrich.

Characterization (NMR, DSC, 2XRD, TGA, UPS)

$^1$H NMR analysis was studied using Bruker AVANCE III 400 MHz spectrometer using tetramethylsilane (TMS) as an internal standard. Fourier-transform infrared spectroscopy (FTIR) was done using a KBr pellet method with Nicolet Magna 560 IR spectrometer. Differential scanning calorimetry (DSC) was performed using TA Instruments DSC Q-100 differential scanning calorimeter by heating and cooling rate of 10° C./min. Thermogravimetric analysis (TGA) was performed using TA Instruments TGA Q-500 at a heating rate of 20° C./min. The molecular weight of POFNB was determined using a Waters GPC system with dimethylacetamide as a mobile phase and polymethyl methacrylate as a standard. Agilent's 5000 UV/VIS/NIR spectrometer was used for band gap measurements.

DFT Calculation

Physical and electronic structures of polymers have been investigated using first-principles density-functional theory (DFT), as implemented in the Vienna Ab-Initio Simulation Package (vasp). In our calculations, crystal slabs of PP and PEEK were modeled while and oligomers with 6 repeat units were used for amorphous polymers (i.e., POFNB), due to the expensive computational cost and a non-artificial difference with longer polymer chains. To fully relax these structures, the Perdew-Burke-Ernzerhof exchange-correlation functional, a plane-wave energy cutoff of 400 eV, and the vdW-DF2 functional were used. The adopted Monkhorst-Pack k-point meshes of 4×1×4, 1×5×1, and 1×1×1 were used for PP, PEEK and other polymers (i.e., POFNB), respectively. The obtained structures were further used to study the electronic structure using the Heyd-Scuseria-Ernzerhof HSE06 functional.

Electrical Measurement

Dielectric Spectroscopy

Dielectric spectroscopy measurement was conducted using a Solartron SI 1260 frequency response analyzer with a Solartron 1296 dielectric interface. The sample as well as a test chamber was put in an oven with a Delta Design 9015 temperature controller, which can control the temperature fluctuation within +0.5° C. in the whole measurement. The measurement was carried out at temperature starting from 30° C. with an increasing step of 10° C. Before each measurement, a 30-minutes delay at set temperature was used to guarantee the sample was in a steady isothermal state.

High Field Conduction

The conduction at high field was measured with a specially designed capacitive measurement system (Li et al., "Transient characterization of extreme field conduction in dielectrics." AIP ADV 6 115025 (2016)). The system uses a small sinusoidal modulation signal superimposed on the voltage ramp to track the capacitive current under transient condition. Using the negative feedback loop formed with a dual-phase lock-in amplifier, the capacitive current can be actively canceled throughout the measurement. The remaining signal represents the integrated residual conduction current through the sample.

Displacement-Electric Field Loop

High field displacement-electric field loop (DE loop) was employed using a modified Sawyer-Tower polarization loop tester. The measurement system was consist of a Trek Model 10/40 10 kV high voltage amplifier and an OPA541 operational amplifier-based current-to-voltage converter. 100 Hz positive half sinusoidal wave with incrementing high voltage was used to produce stimulate electric field, and the response was recorded with the help of the op-amp and formed a hysteresis loop.

Example 1. Monomer Synthesis—Oxafluoronorbornene (OFNB)

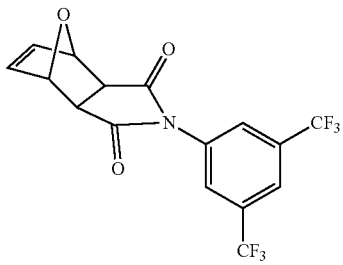 [SMILES: O=C1C2C3C=CC(O3)C2C(=O)N1c1cc(C(F)(F)F)cc(C(F)(F)F)c1]

The monomer oxafluoronorbornene was synthesized in 100 ml round bottom flask under argon atmosphere. The amic acid is synthesized in the first step by reacting exo-7-Oxanorbornene-dicarboxylic anhydride and 3,5-bis(trifluoromethyl) aniline. Firstly, 5 g (30 mmol) exo-7-Oxanorbornene-dicarboxylic anhydride was dispersed in 30 ml of toluene. To this solution 6.9 g (30.1 mmol) of 3,5-bis(trifluoromethyl) aniline in toluene (10 ml) was added dropwise. After this, reaction was stirred at 40° C. for 3 hours and then cooled down room temperature to give white precipitate. Obtained white precipitate is then filtered followed by drying under vacuum to give 10.4 g of amic acid (28.4 mmoles). To the obtained amic acid, anhydrous sodium acetate and acetic anhydride was added and reaction mixture was heated at 70° C. for 5 hours. This reaction mixture is then cooled down to room temperature to give solid precipitate. Obtained reaction mixture is the washed with water and diethyl ether for several times. The diethyl ether layer is then separated and washed using dilute aqueous HCl, saturated $NaHCO_3$ and then with distilled water. The obtained organic ether layer is then collected and solvent is evaporated to obtain a white product. Resulting product is then purified and recrystallization in ethanol and drying under vacuum to give 8.43 g of pure oxafluoronorbornene monomer. Synthesized monomer is then characterized using NMR spectroscopy to confirm the purity of the monomer. Scheme A describes the monomer synthesis of OFNB.

Scheme A.

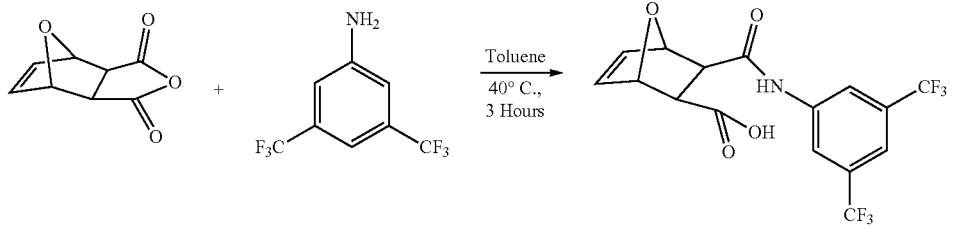

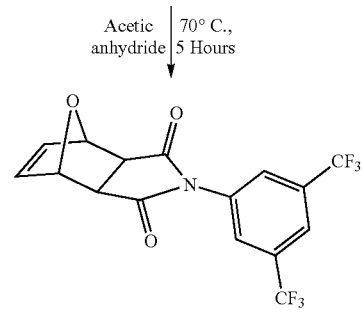

H$^1$ NMR (400 MHz, CDCl$_3$, ppm): δ=7.90 (s, 1H), δ=7.85 (s, 2H), δ=6.59 (s, 2H), δ=3.06 (s, 2H); FTIR (KBr): 3106.42 (C=C—H asym. str), 1789.38 (C=O), 1723.52 (C=O), 1628.79 (C=C str.), 1471.09 (C—N str.), 1400.04 (C—N str), 1278.16 (C—F), 873.80 (C—C str.), δ84.33 cm$^{-1}$ (C—H).

Example 2. Polymer Synthesis
Poly(Oxafluoronorbornene) (POFNB)

The synthesized monomer of Example 1 was polymerized by ring opening metathesis polymerization method using Grubbs 2$^{nd}$ generation catalyst (Scheme B).

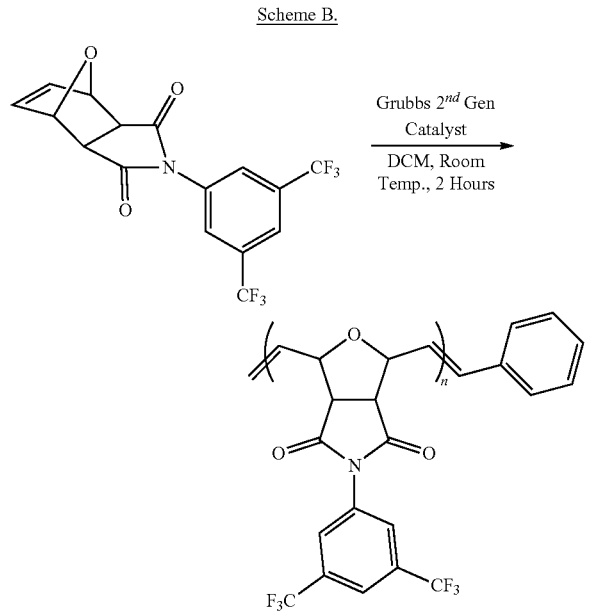

Scheme B.

Synthesized OFNB monomer (2.2 g) was dissolved using DCM (22 ml) as a solvent in a 100 ml round bottom flask under argon atmosphere. In a 20 ml vial Grubbs generation 2 catalyst (0.024 g) was dissolved in 4-5 ml of DCM and this solution is then added to monomer solution under argon atmosphere. The polymerization is then allowed to continue for 2 hours after that reaction is quenched using excess ethyl vinyl ether and reaction is allowed to continue for 20 more minutes. The synthesized polymer is then precipitated in methanol. The obtained polymer is dissolved again in THF and precipitated in methanol to get a white polymer. Resulting polymer is then dried under vacuum to remove excess solvent. Polymer is then characterized using NMR, DSC, TGA, and UV-Vis spectroscopy for structural, thermal and bandgap analysis. After confirmation, polymer films of 10-12 microns thickness are characterized for electrical properties using techniques such as dielectric spectroscopy, D-E loop analysis and high field conduction measurement.

H$^1$ NMR (400 MHz, CDCl3, ppm): δ=7.88-7.74 (m, 3H), δ=6.14 (s, 2H, trans), δ=5.83 (m, 2H, cis), δ=5.22-5.14 (d, 2H), δ=4.64 (s, 2H), δ=3.51 (s, 2H); FTIR (KBr): 3112.77 (C=C—H asym. str.), 1789.38 (C=O), 1731.03 (C=O), 1628.79 (C=C str), 1471.09 (C—N), 1392.53 (C—N), 1279.89 (C—F), 895.17 (C—C str), δ83.18 cm$^{-1}$ (C—H).

Glass transition temperature (Tg) of POFNB is obtained using differential scanning calorimetry. For measurement of Tg polymer sample is three heating and cooling cycles at the rate of 10° C./min. Mentioned Tg is recorded from the third heating cycle. Contribution of imide group, benzene group and CF$_3$ groups to the thermal stability is clearly revealed from the Tg results. From DSC analysis it is observed that POFNB has a glass transition temperature of 186° C.

Molecular weight measurement was obtained using gel permeation chromatography. Table 4 reports the Molecular weight and polydispersity of POFNB.

TABLE 4

| Retention Time | Mn | Mw | Polydispersity |
|---|---|---|---|
| 16.733 | 425433 | 705930 | 1.65 |

POFNB was further characterized using X-ray diffraction measurements and the absence of any sharp peak with the presence of broad peak around 2θ=19° in the diffraction pattern indicates that polymer is amorphous in nature. The uniform diffraction ring in the 2-D XRD pattern confirms that the polymer is isotropic in the nature. This indicates the presence of the random dipoles in the amorphous glassy polymer which act as efficient scattering centers for the hot electron. Further birefringence study indicates isotropic nature of the polymer confirming the random distribution of dipoles in the polymer structure.

The polymer film of POFNB was made using a solution casting method. The 6% polymer solution made in HPLC grade THE was used to make a film using blade applicator on a glass plate. The film is then allowed to dry at room temperature for 12 hours and removed from the glass plate using water. The obtained free-standing film is further dried under vacuum at 80° C. for 12 hours. Bandgap measurement is done using UV-Visible spectroscopy on a dried free-standing film obtained from the solution casting method as described. The UV-vis spectroscopy shows high bandgap of about 4.90 eV. Hence high bandgap and high Tg (186° C. (FIG. 1)) is achieved simultaneously.

Figure 11:
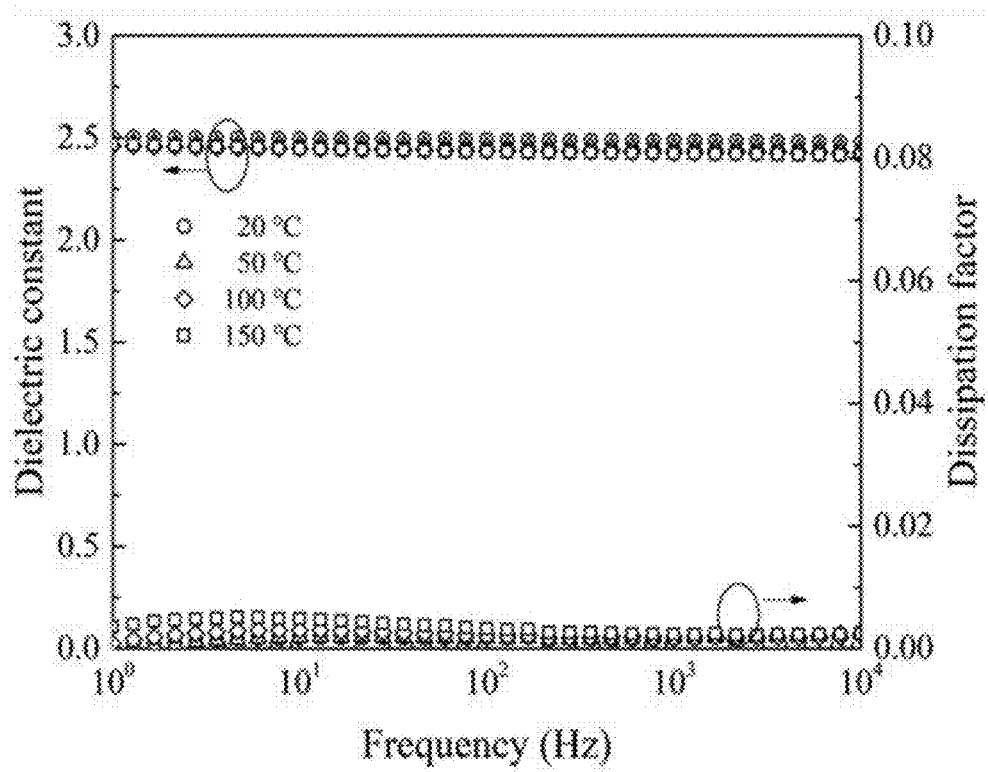
FIG. 11 Dielectric constant and dissipation factor of POFNB at ambient and at elevated temperatures.
Figure 12:
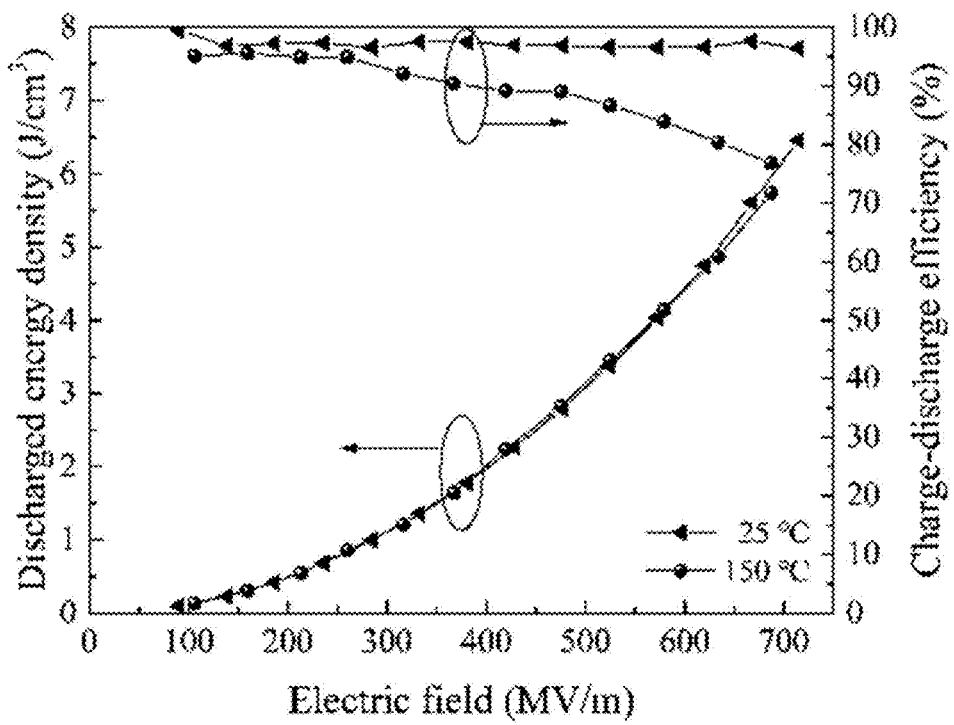
FIG. 12 Discharged energy density and charge discharge efficiency of POFNB at 150° C.

POFNB films were made using solution casting method and tested for electronic properties. From dielectric spectroscopy it can be seen that POFNB has stable dielectric constant of 2.5 with low loss for large temperature and large frequency range (FIG. 11). The D-E loop analysis at 150° C. shows discharged maximum discharged energy density of 5.7 J/cc with high efficiency while at the room temperature the maximum discharged energy density is around 6.5 J/cc (FIG. 12).

At elevated temperature, the key challenge for polymer is the nonlinear grow of temperature and field dependent charge injection and transport process, which led to degradation of the energy storage, increase of the energy dissipation and distortion of the electric field. In this respect, large band gap is of great significance to increase the barriers for charge injection at the polymer/electrode interface and for interband charge transport in the bulk of the polymer, as elaborated by the composite and coating modification techniques. However, as evidenced in FIG. 1, the improvement of glass transition temperature (Tg) here for conventional high temperature polymers with aromatic conjugated backbones was built on the cost of highly reduced band gap. Such reduction in band gap for these high temperature operable polymers resulted in compromised high field electrical performance and poor discharged energy density at high temperature. Therefore, in POFNB high thermal stability is achieved with alicyclic moiety in the backbone rather than aromatic structure without sacrificing the band gap. To the alicyclic part of the backbone, aromatic benzene with trifluoromethyl substitutions at 3 and 5 position, is attached through imide linkage, forming a suspended-ladder structure (Scheme B, right side).

Example 3. Monomer Synthesis—m-OFNB

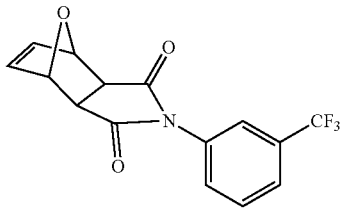 [SMILES: O=C1C2C3C=CC(O3)C2C(=O)N1c1cccc(C(F)(F)F)c1]

The m-OFNB monomer was synthesized using same procedure as described for OFNB monomer in Example 1. 3-(Trifluoromethyl)aniline was used instead of 3,5-bis(trifluoromethyl) aniline. Synthesized monomer is then characterized using NMR analysis for structural characterization.

Example 4. Polymer Synthesis m-POFNB

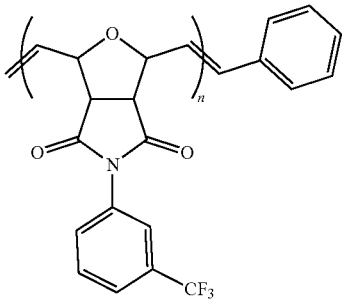

m-POFNB polymer was synthesized and purified using the procedure described for synthesis of POFNB in Example 2 and monomer m-OFNB. Similarly, m-POFNB is characterized for structural as well as electrical properties.

From DSC analysis m-POFNB shows glass transition temperature of about 178° C. which is lower than the POFNB itself. The UV-Vis spectroscopy shows onset at 256 nm which corresponds to bandgap of 4.84 eV.

From dielectric spectroscopy it was found that m-POFNB has dielectric constant of 3.3 which is higher than the POFNB dielectric constant. Presence of —$CF_3$ in asymmetric manner helps in improving the dielectric constant compared to POFNB. From D-E loop analysis it can be seen that at ambient temperature m-POFNB gives maximum discharged energy density of 8.8 J/cc. At 150° C. m-POFNB has discharged energy density of 7.44 J/cc with 70% efficiency.

Example 5. Monomer Synthesis—p-OFNB

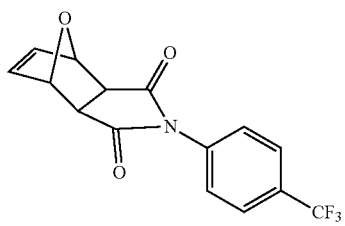 [SMILES: O=C1C2C3C=CC(O3)C2C(=O)N1c1ccc(C(F)(F)F)cc1]

The p-OFNB monomer was synthesized using same procedure as described for OFNB monomer in Example 1. 4-(Trifluoromethyl)aniline was used instead of 3,5-bis(trifluoromethyl) aniline. The monomer was then characterized using NMR analysis.

Example 6. Polymer Synthesis p-POFNB

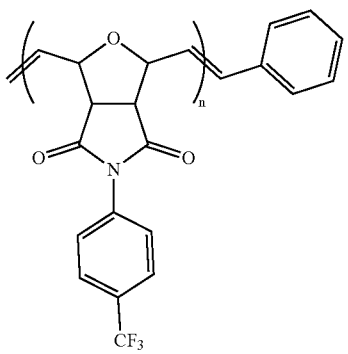

p-POFNB polymer was synthesized and purified using the procedure described for synthesis of POFNB in Example 2 and monomer p-OFNB. The synthesized p-POFNB is then characterized for structural and electrical properties. p-POFNB shows glass transition temperature of about 220° C. More symmetric repeat unit of p-POFNB results in high Tg of p-POFNB compared to POFNB. While the UV-Vis spectroscopy shows bandgap of around 4.46 eV.

For p-POFNB at ambient temperature the discharged energy density is about 7 J/cc with 80% efficiency and 150° C. the discharged energy density is around 6 J/cc with efficiency around 62%. While, the p-POFNB shows dielectric constant around 3.00. The presence of one —$CF_3$ group results in lower free volume compared to POFNB that results in high Dk value than POFNB.

Example 7. Monomer Synthesis—o-OFNB

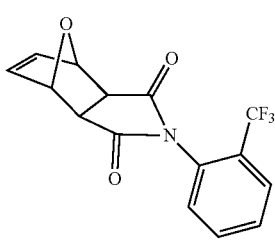 [SMILES: O=C1C2C3C=CC(O3)C2C(=O)N1c1ccccc1C(F)(F)F]

The o-OFNB monomer was synthesized using same procedure as described for OFNB monomer in Example 1. 2-(Trifluoromethyl)aniline was used instead of 3,5-bis(trifluoromethyl) aniline. Synthesized monomer was then characterized using NMR analysis.

Example 8. Polymer Synthesis o-POFNB

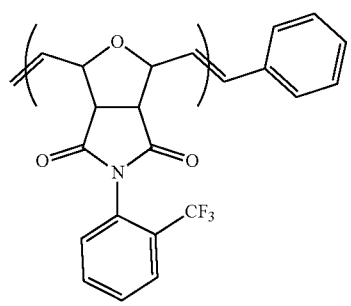

o-POFNB polymer was synthesized and purified using the procedure described for synthesis of POFNB in Example 2 and the o-OFNB monomer. Structure and thermal characterization of synthesized polymer was carried out using NMR, DSC and TGA analysis. DSC analysis of o-POFNB shows high glass transition temperature of about 244° C. Restricted movement of side groups results high Tg of o-POFNB. While the bandgap of o-POFNB polymer is maintained at 4.92 eV.

At 150 and 200° C. the maximum discharged energy density values for o-POFNB are 8.3 J/cc with 83% efficiency and 6.5 J/cc with 81% efficiency, respectively owing to its high breakdown strength (FIG. 12c, 12d, 12e). As per our knowledge, there is no other flexible polymer or polymer composite reported with energy density value greater than that of o-POFNB at 150° C. and 200° C. with such a high efficiency. For o-POFNB the discharged energy density obtained for about 90% efficiency at 150° C. is around 6.0 J/cc outperforming all the reported high temperature polymer or polymer composite dielectrics. Even at 200° C. the discharged energy density with about 90% efficiency is around 2.3 J/cc, the highest ever discharged energy density obtained so far for any dielectric material with high efficiency and at such a high temperature.

Figure 5:
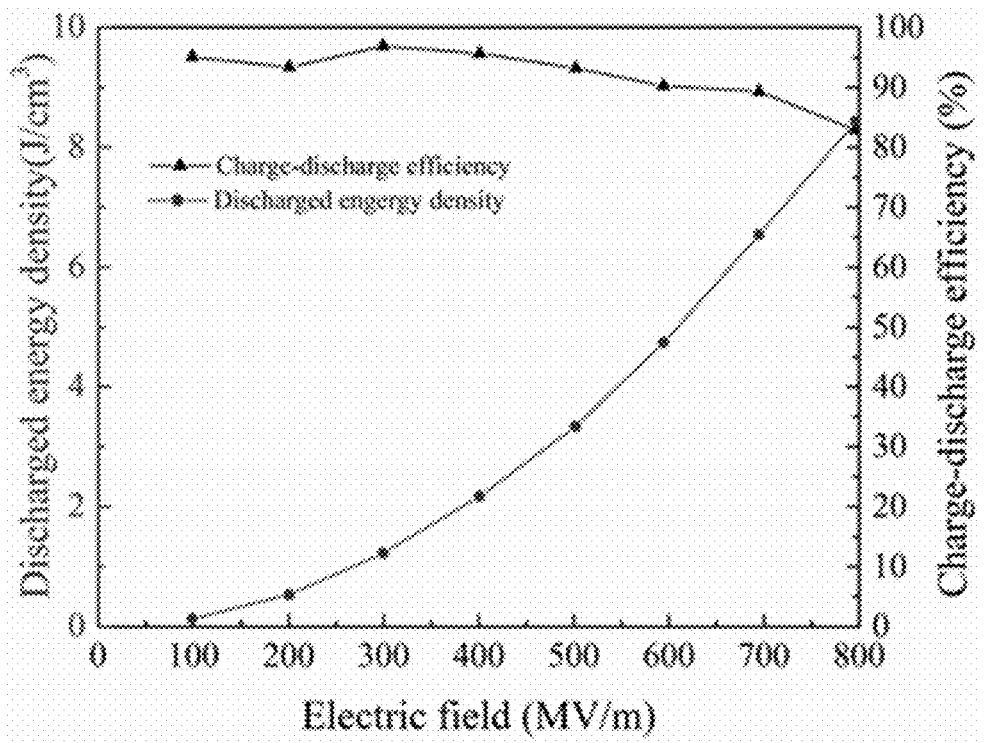
FIG. 5 reports the discharged energy density and charge discharge efficiency of o-POFNB at 150° C.
Figure 6:
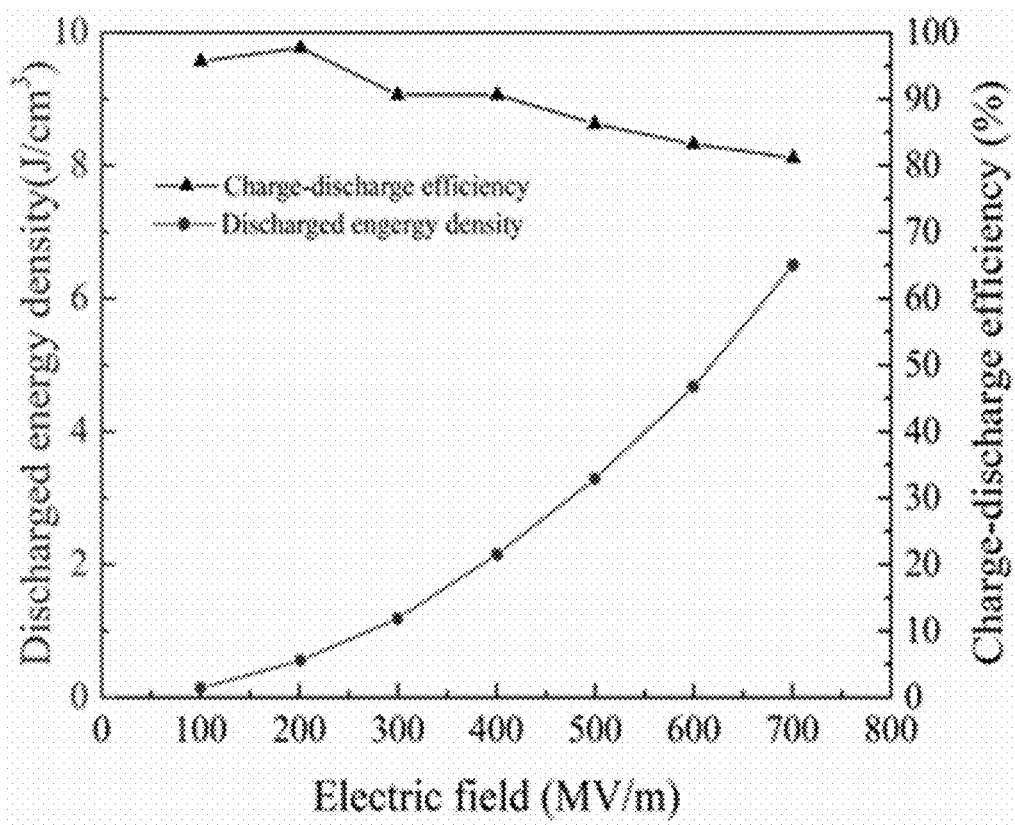
FIG. 6 reports the discharged energy density and charge discharge efficiency of o-POFNB at 200° C.
Figure 13:
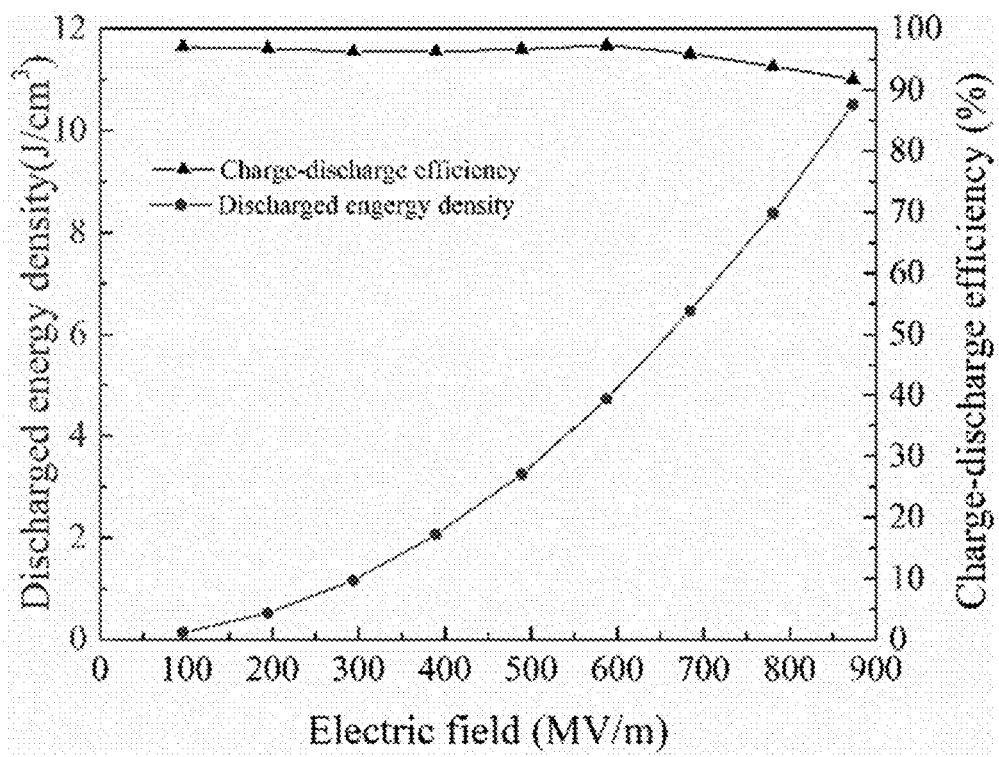
FIG. 13 reports the discharged energy density and charge discharge efficiency of o-POFNB at 25° C.

FIG. 13 reports the discharged energy density and charge discharge efficiency of o-POFNB at 25° C. FIG. 5 and FIG. 6 report the discharged energy density and charge discharge efficiency of o-POFNB at 150° C. and 200° C., respectively. FIG. 8 reports the maximum discharged energy density of POFNB-type polymers and other best reported dielectric polymers at 150° C. as a function of applied electric field.

Example 9. Monomer Synthesis-2-Methoxy-5-nitro oxanorborneneimide

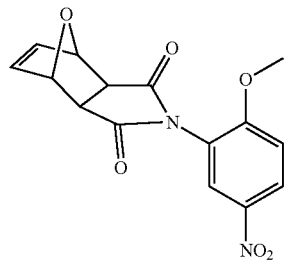 [SMILES: COc1ccc([N+](=O)[O-])cc1N1C(=O)C2C3C=CC(O3)C2C1=O]

Monomer 2-methoxy-5-nitro oxanorborneneimide was synthesized using same procedure as described for OFNB monomer in Example 1. 2-Methoxy-5-nitroaniline was used instead of 3,5-bis(trifluoromethyl) aniline. Monomer is then characterized using NMR analysis for structural identification.

Example 10. Polymer Synthesis of poly(2-methoxy-5-nitroaniline)oxanorborneneimide

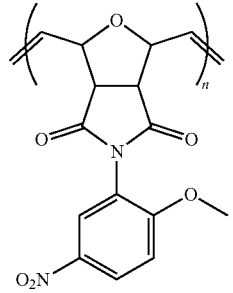

Poly(2-methoxy-5-nitroaniline)oxanorborneneimide polymer was synthesized using the procedure described for POFNB in Example 2 using monomer 2-methoxy-5-nitro oxanorborneneimide. In this case polymer crashes out from the DCM i.e. reaction solvent. Crashed polymers is then dissolved in DMSO and ethyl vinyl ether is added to remove the catalyst. Dissolved polymer is then precipitated in methanol. Dissolution and precipitation carried out one more time for further purification.

Example 11. Vinyl Addition Polymerization of Oxafluoronorbornene (OFNB)

Vinyl addition polymerization of monomer oxafluoronorbornene (OFNB)
1) 30.0 mg (0.114 mmol) of di-p-chloro-bis-(6-methoxybicyclo[2.2.1]hept-2-ene-endo-5-σ,2π)-palladium (II) is dissolved in 4.0 ml of chlorobenzene to produce solution (1).
2) 22.1 mg (0.114 mmol) of silver tetrafluoroborate and 0.50 g (5.3 mmol) of monomer OFNB are dissolved in 2.0 ml of chlorobenzene to produce solution (2).
3) Solution (1) is added to solution (2) and stirred for 15 minutes at room temperature. The silver chloride formed is then filtered using 0.45 micron filter. Clear brown solution is obtained after the filtration (solution (3)).

4) 1.0 ml of solution (3) is then added to a solution of 1.26 μm (0.021 mol) of monomer OFNB in 2.4 ml of chlorobenzene.

5) This reaction mixture is then stirred for about 15 minutes to about 4 hours at room temperature and then precipitated in methanol. The obtained polymer is dissolved again in chlorobenzene and precipitated in methanol for further purification.

6) Polymer is then dried under vacuum at 150° C.

-continued

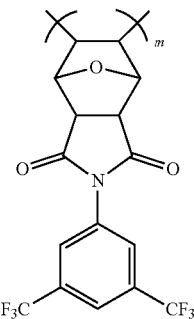

Catalyst Synthesis Scheme

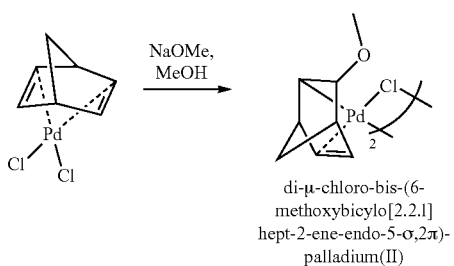

di-μ-chloro-bis-(6-methoxybicylo[2.2.1]hept-2-ene-endo-5-σ,2π)-palladium(II)

Polymer Synthesis Scheme - Vinyl Addition

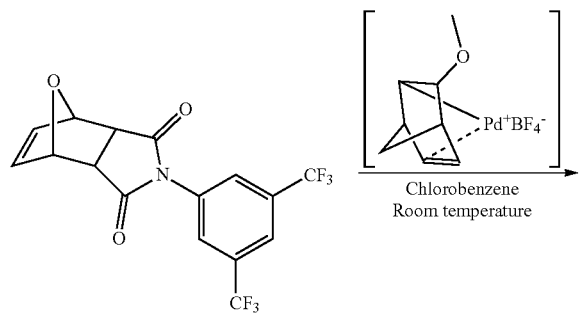

A similar procedure can be used to prepare other vinyl addition polymers according to formula (III) starting from the appropriate monomer. The reaction time may be conducted from about 15 minutes to about 4 hours. The reaction temperature may be adjusted from ambient to about 50° C. to further promote kinetics for formation of polymer product.

Example 12. Calculations for Theoretical Values Tg and Bandgap

Figure 14:
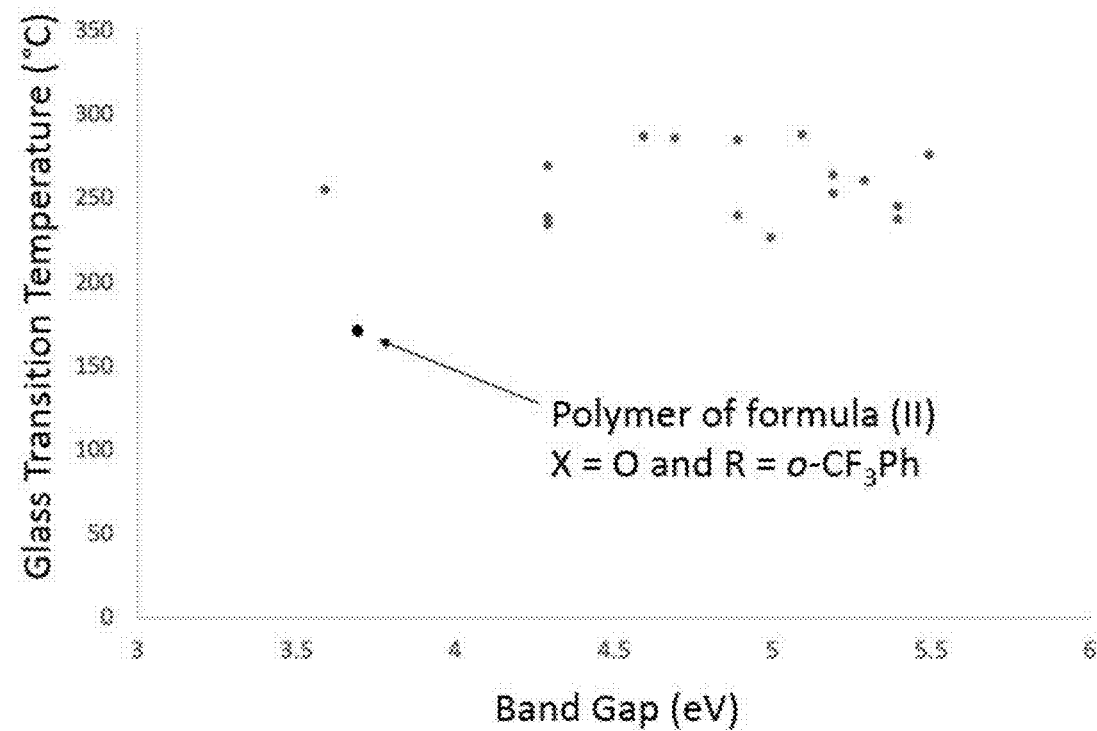
FIG. 14 Theoretical values for band gap and glass transition temperature using the Polymer Genome Machine Learning Algorithm for polymer variations of formula (III) and ROMP polymer o-POFNB.

Calculations of glass transition temperature and bandgap for various polymers according to formula (III) were conducted using the Polymer Genome Machine Learning Algorithm. The structures and calculated values are set out in Table 5 and graphically displayed in FIG. 14. These polymers may be prepared by vinyl addition polymerization as previously discussed. For comparison, the Tg and bandgap were calculated for ROMP polymer o-POFNB of formula (II) using the same algorithm; the results are included in the table and graph. The polymers according to formula (III) all have a higher calculated Tg and all but one have a higher calculated bandgap compared to the calculated Tg and bandgap for o-POFNB. These results indicate that the polymers according to formula (III) will be superior with respect to dielectric breakdown at high temperature. All these polymers have the motif of rotatable single bonds between rigid units. It should be noted that the theoretical value for Tg calculated for o-POFNB is 171° C., which is about 70° C. lower than the experimentally determined value (about 244-245° C.). It is further noted that the theoretical value for bandgap calculated for o-POFNB is 3.7 eV, which is lower than the experimentally determined value (4.92 eV, Example 8). Higher band gap and higher glass transition temperature are indicators of a high breakdown, high operation temperature dielectric. Based on the calculations for the polymers according to formula (III), these polymers should operate above 200° C. and even up as high as 250° C.

TABLE 5

| Polymer of formula (III) | | | |
| --- | --- | --- | --- |
| X | R | Band Gap (eV) | Tg (C) |
| $CH_2$ | Ph | 4.6 | 286 |
| $CH_2$ | $F_3C$-phenyl | 4.7 | 285 |

TABLE 5-continued
| | | | |
|---|---|---|---|
| O | Ph | 5.3 | 260 |
| O | 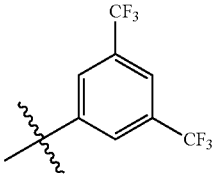 [SMILES: *c1cc(C(F)(F)F)cc(C(F)(F)F)c1] | 5.4 | 237 |
| O | 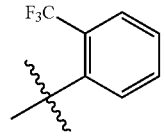 [SMILES: *c1ccccc1C(F)(F)F] | 5.5 | 275 |
| O | 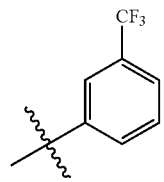 [SMILES: *c1cccc(C(F)(F)F)c1] | 5.4 | 245 |
| O | 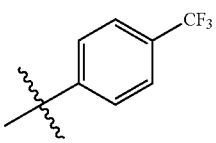 [SMILES: *c1ccc(C(F)(F)F)cc1] | 5 | 226 |
| O | 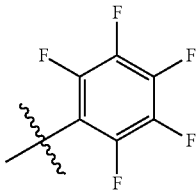 [SMILES: *c1c(F)c(F)c(F)c(F)c1F] | 5.2 | 252 |
| O | 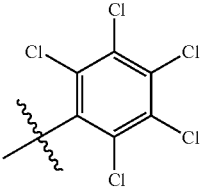 [SMILES: *c1c(Cl)c(Cl)c(Cl)c(Cl)c1Cl] | 4.9 | 284 |
| O | 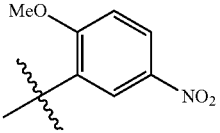 [SMILES: *c1cc([N+](=O)[O-])ccc1OC] | 5.2 | 263 |
| O | 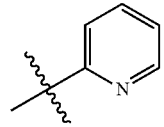 [SMILES: *c1ccccn1] | 4.9 | 239 |
| O | 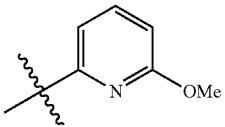 [SMILES: *c1cccc(OC)n1] | 5.1 | 287 |

TABLE 5-continued

| | | Band Gap (eV) | Tg (C) |
|---|---|---|---|
| NH | 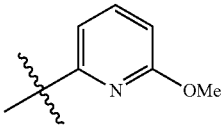 [SMILES: *c1cccc(OC)n1] | 4.3 | 238 |
| NCH$_3$ | 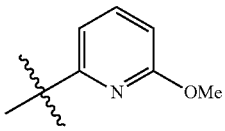 [SMILES: *c1cccc(OC)n1] | 4.3 | 234 |
| NPh | 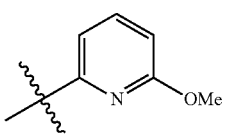 [SMILES: *c1cccc(OC)n1] | 4.3 | 269 |
| 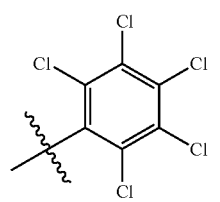 [SMILES: *c1c(Cl)c(Cl)c(Cl)c(Cl)c1Cl] | 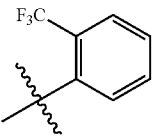 | 3.6 | 254 |

Polymer of formula (II)

| X | R | Band Gap (eV) | Tg (C) |
|---|---|---|---|
| O | 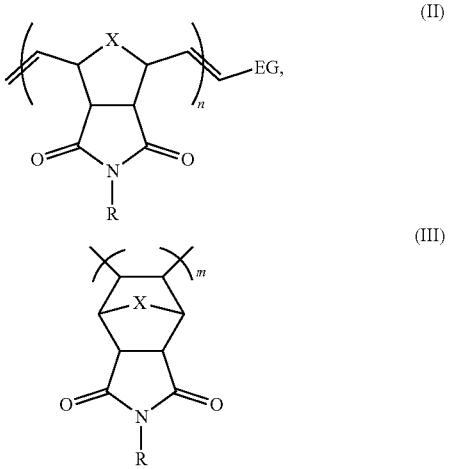 | 3.7 | 171 |

Included are the following aspects:

Aspect 1: A dielectric polymer according to formula (II) or formula (III)

$$\text{(II)}$$

$$\text{(III)}$$

wherein
each X individually is O, S, NR$^1$, C(R$^2$)$_2$, or C(R$^2$)$_2$—C(R$^2$)$_2$ wherein R$^1$ is H, C$_{1-10}$ alkyl, specifically C$_{1-6}$ alkyl, C$_{1-10}$ haloalkyl, substituted or unsubstituted aryl, or substituted or unsubstituted heteroaryl, and each R$^2$ independently is H, halo, or C$_{1-10}$ alkyl, specifically C$_{1-6}$ alkyl, specifically X is O, S, NH, NR$^1$, or CH$_2$, and more specifically X is O or CH$_2$;

EG is an end group;

each R individually is a substituted or unsubstituted aryl or substituted or unsubstituted heteroaryl,
  wherein each of the substituted aryl and substituted heteroaryl of group R and R$^1$ is substituted with 1, 2, 3, 4, or 5 substituents, specifically R is substituted aryl, more specifically R is 2-substituted phenyl or 3,5-disubstituted phenyl wherein the substitution is C$_{1-6}$ alkyl or C$_{1-6}$ haloalkyl, each substituent on the substituted aryl and substituted heteroaryl of groups R and R$^1$ independently is C$_{1-20}$ alkyl, specifically C$_{1-8}$ alkyl, C$_{1-20}$ haloalkyl, specifically C$_{1-8}$ haloalkyl, C$_{1-20}$ alkoxy, specifically C$_{1-8}$ alkoxy, C$_{1-20}$ haloalkoxy, specifically C$_{1-8}$ haloalkoxy, halo, —NH$_2$, —NHR$^3$, —N(R$^3$)$_2$, nitro, cyano, hydroxyl, aryl, heteroaryl, or a combination thereof, wherein R$^3$ is C$_{1-20}$ alkyl, specifically C$_{1-8}$ alkyl;

n is about 74 to about 200, specifically about 100 to about 175, and more specifically about 125 to about 150; and m is about 74 to about 200, specifically about 100 to about 175, and more specifically about 125 to about 150.

Aspect 2: The polymer of Aspect 1, wherein X is O, S, NR$^1$, or CH$_2$, wherein R$^1$ is H, CH$_3$, or unsubstituted or substituted aryl or unsubstituted or substituted heteroaryl.

Aspect 3: The polymer of Aspects 1 or 2, wherein EG is an unsubstituted or substituted aryl, specifically phenyl.

Aspect 4: The polymer of any one of Aspects 1-3, wherein R is substituted aryl or substituted heteroaryl, wherein each is substituted with 1, 2, or 3 substituents, specifically 1 or 2 substituents, more specifically 1 substituent.

Aspect 5: The polymer of any one of Aspects 1-3, wherein R is substituted phenyl substituted with 1 or 2 substituents and each substituent is independently $C_{1-8}$ alkyl, $C_{1-8}$ alkoxy, nitro, or $C_{1-8}$ haloalkyl.

Aspect 6: The polymer of any one of Aspects 1-3, wherein R is substituted aryl or substituted heteroaryl and each substituent is independently $C_{1-8}$ alkyl, $C_{1-8}$ haloalkyl, $C_{1-8}$ alkoxy, $C_{1-8}$ haloalkoxy, halo, $-NH_2$, $-NHR^3$, $-N(R^3)_2$, nitro, cyano, hydroxyl, aryl, heteroaryl, or a combination thereof, wherein $R^3$ is $C_{1-20}$ alkyl, specifically $C_{1-8}$ alkyl.

Aspect 7: The polymer of any one of Aspects 1-3, 1 wherein R is substituted aryl or substituted heteroaryl and each substituent is independently $C_{1-8}$ alkyl, $C_{1-8}$ alkoxy, nitro, or $C_{1-8}$ haloalkyl.

Aspect 8: The polymer of any one of Aspects 1-7, having one or more of the following:
a.) Tg of greater than or equal to 150° C., specifically about 175 to about 350° C., more specifically about 180 to about 300° C., and yet more specifically about 200 to about 275° C.;
b.) Band gap of greater than or equal to 4.1 eV, specifically about 4.2 to about 5.5 eV, specifically about 4.1, about 4.2, about 4.3, about 4.4, about 4.5, about 4.6, about 4.7, about 4.8, about 4.9, about 5.0, about 5.1, about 5.2, about 5.3, about 5.4, or about 5.5 or any range in between;
c.) a maximum discharged energy density of greater than 5.0 J/cm³ with efficiency at or above 90% at a temperature of 150° C. or 200° C., specifically about 5.5 to about 10 J/cm³, more specifically about 6 to about 9 J/cm³, yet more specifically about 7 to about 8 J/cm³ with efficiency at or above 90% at a temperature of 150° C. or 200° C.;
d.) a maximum discharged energy density of greater than 5.0 J/cm³ at a temperature of 150° C. and an electric field of greater than 650 MV/m or between 650 and 800 MV/m, specifically about 5.5 to about 10 J/cm³, more specifically about 6 to about 9 J/cm³, yet more specifically about 7 to about 8 J/cm³ at a temperature of 150° C. and an electric field of greater than 650 MV/m or between 650 and 800 MV/m;
e.) an operating temperature from about −160 to about 250° C.;
f.) an operating temperature from about −160 to about 225° C.; and
g.) an operating temperature from about −160 to about 200° C.

Aspect 9: A monomer according to formula (I)

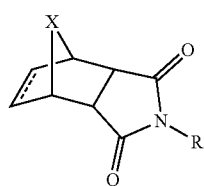

(I)

wherein
X is O, S, $NR^1$, $C(R^2)_2$, or $C(R^2)_2-C(R^2)_2$ wherein $R^1$ is H, $C_{1-10}$ alkyl, specifically $C_{1-6}$ alkyl, $C_{1-10}$ haloalkyl, substituted or unsubstituted aryl, or substituted or unsubstituted heteroaryl, and each $R^2$ independently is H, halo, or $C_{1-10}$ alkyl, specifically $C_{1-6}$ alkyl, specifically X is O, S, NH, $NR^1$, or $CH_2$, and more specifically X is O or $CH_2$;
------- is a single or double bond;
R is a substituted or unsubstituted aryl or substituted or unsubstituted heteroaryl,
wherein each of the substituted aryl and substituted heteroaryl of R and $R^1$ is substituted with 1, 2, 3, 4, or 5 substituents, specifically R is substituted aryl, more specifically R is 2-substituted phenyl or 3,5-disubstituted phenyl wherein the substitution is $C_{1-6}$ alkyl or $C_{1-6}$ haloalkyl,
each substituent on the substituted aryl and substituted heteroaryl of groups R and $R^1$ independently is $C_{1-20}$ alkyl, specifically $C_{1-8}$ alkyl, $C_{1-20}$ haloalkyl, specifically $C_{1-8}$ haloalkyl, $C_{1-20}$ alkoxy, specifically $C_{1-8}$ alkoxy, $C_{1-20}$ haloalkoxy, specifically $C_{1-8}$ haloalkoxy, halo, $-NH_2$, $-NHR^3$, $-N(R^3)_2$, nitro, cyano, hydroxyl, aryl, heteroaryl, or a combination thereof, wherein $R^3$ is $C_{1-20}$ alkyl, specifically $C_{1-8}$ alkyl.

Aspect 10: A dielectric polymer comprising units derived from a monomer according to formula (I) of Aspect 9.

Aspect 11: A composition comprising the dielectric polymer of any one of Aspects 1-8 or 10.

Aspect 12: An article comprising the dielectric polymer of any one of Aspects 1-8 or 10 or the composition of Aspect 11.

Aspect 13: The article of Aspect 12, wherein the article is a capacitor; specifically a high energy density capacitor.

Aspect 14: A process for producing a dielectric polymer, comprising
conducting Ring Opening Metathesis Polymerization or vinyl addition polymerization of a monomer of formula (I)×

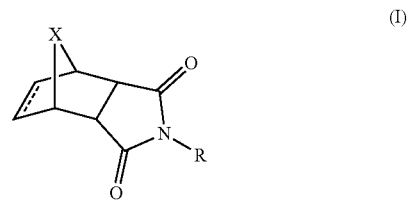

(I)

wherein
X is O, S, $NR^1$, $C(R^2)_2$, or $C(R^2)_2-C(R^2)_2$ wherein $R^1$ is H, $C_{1-10}$ alkyl, specifically $C_{1-6}$ alkyl, $C_{1-10}$ haloalkyl, substituted or unsubstituted aryl, or substituted or unsubstituted heteroaryl, and each $R^2$ independently is H, halo, or $C_{1-10}$ alkyl, specifically $C_{1-6}$ alkyl, specifically X is O, S, NH, $NR^1$, or $CH_2$, and more specifically X is O or $CH_2$;
------- is a single or double bond;
R is a substituted or unsubstituted aryl or substituted or unsubstituted heteroaryl,
wherein each of the substituted aryl and substituted heteroaryl of R and $R^1$ is substituted with 1, 2, 3, 4, or 5 substituents, specifically R is substituted aryl, more specifically R is 2-substituted phenyl or 3,5-disubstituted phenyl wherein the substitution is $C_{1-6}$ alkyl or $C_{1-6}$ haloalkyl,
each substituent on the substituted aryl and substituted heteroaryl of group R and $R^1$ independently is $C_{1-20}$ alkyl, specifically $C_{1-8}$ alkyl, $C_{1-20}$ haloalkyl, specifically $C_{1-8}$ haloalkyl, $C_{1-20}$ alkoxy, specifically $C_{1-8}$ alkoxy, $C_{1-20}$ haloalkoxy, specifically $C_{1-8}$ haloalkoxy, halo, —$NH_2$, —$NHR^3$, —$N(R^3)_2$, nitro, cyano, hydroxyl, aryl, heteroaryl, or a combination thereof, wherein $R^3$ is $C_{1-20}$ alkyl, specifically $C_{1-8}$ alkyl.

Aspect 15: A dielectric polymer, comprising
a polymer backbone and a pendent group,
the polymer backbone comprises
  alternating repeat units of a first rigid domain separated by single bonds, or
  alternating repeat units of a first rigid domain and a second rigid domain separated by single bonds,
wherein the pendent group is an optionally substituted aromatic group attached to the first rigid domain by a single bond; and
wherein the dielectric polymer has one or more of the following:
  a.) Tg of greater than or equal to 150° C., specifically about 175 to about 350° C., more specifically about 180 to about 300° C., and yet more specifically about 200 to about 275° C.;
  b.) Band gap of greater than or equal to 4.1 eV, specifically about 4.2 to about 5.5 eV, specifically about 4.1, about 4.2, about 4.3, about 4.4, about 4.5, about 4.6, about 4.7, about 4.8, about 4.9, about 5.0, about 5.1, about 5.2, about 5.3, about 5.4, or about 5.5 or any range in between;
  c.) a maximum discharged energy density of greater than 5.0 $J/cm^3$ with efficiency at or above 90% at a temperature of 150° C. or 200° C., specifically about 5.5 to about 10 $J/cm^3$, more specifically about 6 to about 9 $J/cm^3$, yet more specifically about 7 to about 8 $J/cm^3$ with efficiency at or above 90% at a temperature of 150° C. or 200° C.;
  d.) a maximum discharged energy density of greater than 5.0 $J/cm^3$ at a temperature of 150° C. and an electric field of greater than 650 MV/m or between 650 and 800 MV/m, specifically about 5.5 to about 10 $J/cm^3$, more specifically about 6 to about 9 $J/cm^3$, yet more specifically about 7 to about 8 $J/cm^3$ at a temperature of 150° C. and an electric field of greater than 650 MV/m or between 650 and 800 MV/m;
  e.) an operating temperature from about −160 to about 250° C.;
  f.) an operating temperature from about −160 to about 225° C.; and
  g.) an operating temperature from about −160 to about 200° C.

Aspect 16: The polymer of Aspect 15, wherein the first rigid domain is an alicyclic group, specifically an alicyclic fused ring system, and more specifically an alicyclic fused bicyclic ring system.

Aspect 17: The polymer of Aspect 15 or 16, wherein the second rigid domain is ethylene (—CH═CH—) or ethyne (—C≡C—).

Aspect 18: The polymer of any one of Aspects 15-17, wherein the aromatic group is a substituted or unsubstituted aryl or substituted or unsubstituted heteroaryl,
  wherein each of the substituted aryl and substituted heteroaryl is substituted with 1, 2, 3, 4, or 5 substituents; and
  each substituent on the substituted aryl and substituted heteroaryl independently is $C_{1-20}$ alkyl, specifically $C_{1-8}$ alkyl, $C_{1-20}$ haloalkyl, specifically $C_{1-8}$ haloalkyl, $C_{1-20}$ alkoxy, specifically $C_{1-8}$ alkoxy, $C_{1-20}$ haloalkoxy, specifically $C_{1-8}$ haloalkoxy, halo, —$NH_2$, —$NHR^3$, —$N(R^3)_2$, nitro, cyano, hydroxyl, aryl, or heteroaryl, wherein $R^3$ is $C_{1-20}$ alkyl, specifically $C_{1-8}$ alkyl.

All patents, published patent applications and other documents cited herein and the following listed documents and all referenced publications cited therein, and the descriptions and information contained in these documents are expressly incorporated herein in their entirety to the same extent as if each document or cited publication was individually and expressly incorporated herein.

If a term in the present application contradicts or conflicts with a term in an incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and words of a similar nature in the context of describing the improvements disclosed herein (especially in the context of the following claims) are to be construed to cover both the singular and the plural, unless otherwise indicated herein or clearly contradicted by context. Further, it should further be noted that the terms "first," "second," and the like herein do not denote any order, quantity, or relative importance, but rather are used to distinguish one element from another. The modifier "about" used in connection with a quantity is inclusive of the stated value and has the meaning dictated by the context (e.g., it includes, at a minimum the degree of error associated with measurement of the particular quantity).

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed.

Chemical compounds are described using standard nomenclature. Unless defined otherwise, all technical and scientific terms used herein have the same meaning as is commonly understood by one of skill in the art to which this invention belongs. Structures and formulas include all subformulae thereof.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A dielectric polymer according to formula (II) or formula (III)

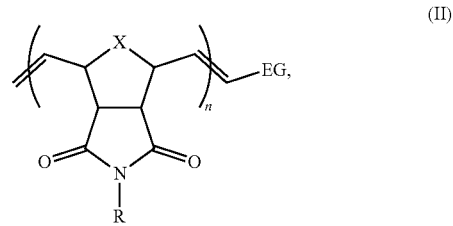

-continued

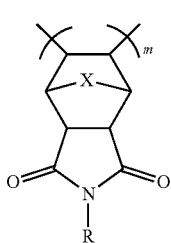
(III)

wherein
each X individually is O, S, NR$^1$, C(R$^2$)$_2$, or C(R$^2$)$_2$—C(R$^2$)$_2$ wherein R$^1$ is H, C$_{1-10}$ alkyl, C$_{1-10}$ haloalkyl, substituted or unsubstituted aryl, or substituted or unsubstituted heteroaryl, wherein each of the substituted aryl and substituted heteroaryl of R$^1$ is substituted with 1, 2, 3, 4, or 5 substituents, each substituent independently is C$_{1-20}$ alkyl, C$_{1-20}$ haloalkyl, C$_{1-20}$ alkoxy, C$_{1-20}$ haloalkoxy, halo, —NH$_2$, —NHR$^3$, —N(R$^3$)$_2$, nitro, cyano, hydroxyl, aryl, heteroaryl, or a combination thereof, wherein R$^3$ is C1-20 alkyl, and each R$^2$ independently is H, halo, or C$_{1-10}$ alkyl;
EG is an end group;
a) when X is S, NR$^1$, C(R$^2$)$_2$, or C(R$^2$)$_2$—C(R$^2$)$_2$ then R is a substituted or unsubstituted aryl or substituted or unsubstituted heteroaryl;
wherein each of the substituted aryl and substituted heteroaryl of group R is substituted with 1, 2, 3, 4, or 5 substituents,
each substituent on the substituted aryl and substituted heteroaryl of group R independently is C$_{1-20}$ alkyl C$_{1-20}$ haloalkyl, C$_{1-20}$ alkoxy, C$_{1-20}$ haloalkoxy, halo, —NH$_2$, —NHR$^3$, —N(R$^3$)$_2$, nitro, cyano, hydroxyl, aryl, heteroaryl, or a combination thereof,
wherein R$^3$ is C$_{1-20}$ alkyl; and
b) when X is O then R is a substituted aryl or substituted heteroaryl,
wherein each of the substituted aryl and substituted heteroaryl of R is substituted with 1, 2, 3, 4, or 5 substituents,
each substituent on the substituted aryl and substituted heteroaryl of group R independently is C$_{1-20}$ haloalkyl, C$_{1-20}$ haloalkoxy, —NHR$^3$, —N(R$^3$)$_2$, cyano, aryl, heteroaryl, or a combination thereof, wherein R$^3$ is C$_{1-20}$ alkyl;
n is about 74 to about 200; and
m is about 74 to about 200.

2. The polymer of claim 1, wherein X is O, S, NR$^1$, or CH$_2$, wherein R$^1$ is H, CH$_3$, or unsubstituted or substituted aryl or unsubstituted or substituted heteroaryl.

3. The polymer of claim 1, wherein EG is an unsubstituted or substituted aryl.

4. The polymer of claim 1, wherein R is substituted aryl or substituted heteroaryl, wherein each is substituted with 1, 2, or 3 substituents.

5. The polymer of claim 1, wherein R is substituted phenyl substituted with 1 or 2 substituents and each substituent is independently C$_{1-8}$ alkyl, C$_{1-8}$ alkoxy, nitro, or C$_{1-8}$ haloalkyl.

6. The polymer of claim 1, wherein R is substituted aryl or substituted heteroaryl and each substituent is independently C$_{1-8}$ alkyl, C$_{1-8}$ haloalkyl, C$_{1-8}$ alkoxy, C$_{1-8}$ haloalkoxy, halo, —NH$_2$, —NHR$^3$, —N(R$^3$)$_2$, nitro, cyano, hydroxyl, aryl, heteroaryl, or a combination thereof, wherein R$^3$ is C$_{1-20}$ alkyl.

7. The polymer of claim 1, wherein R is substituted aryl or substituted heteroaryl and each substituent is independently C$_{1-8}$ alkyl, C$_{1-8}$ alkoxy, nitro, or C$_{1-8}$ haloalkyl.

8. The polymer of claim 1, having one or more of the following:
a.) Tg of greater than or equal to 150° C.;
b.) Band gap of greater than or equal to 4.1 eV;
c.) a maximum discharged energy density of greater than 5.0 J/cm$^3$ with efficiency at or above 90% at a temperature of 150° C.;
d.) a maximum discharged energy density of greater than 5.0 J/cm$^3$ at a temperature of 150° C. and an electric field of greater than 650 MV/m or between 650 and 800 MV/m; and
e.) an operating temperature from about −160 to about 250° C.

9. A composition comprising the dielectric polymer of claim 1.

10. An article comprising the dielectric polymer of claim 1.

11. The article of claim 10, wherein the article is a capacitor.

12. A monomer according to formula (I)

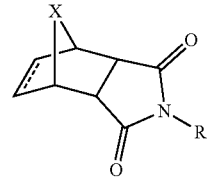
(I)

wherein
X is O, S, NR$^1$, C(R$^2$)$_2$, or C(R$^2$)$_2$—C(R$^2$)$_2$ wherein R$^1$ is H, C$_{1-10}$ alkyl, C$_{1-10}$ haloalkyl, substituted or unsubstituted aryl, or substituted or unsubstituted heteroaryl, wherein each of the substituted aryl and substituted heteroaryl of R$^1$ is substituted with 1, 2, 3, 4, or 5 substituents, each substituent independently is C$_{1-20}$ alkyl, C$_{1-20}$ haloalkyl, C$_{1-20}$ alkoxy, C$_{1-20}$ haloalkoxy, halo, —NH$_2$, —NHR$^3$, —N(R$^3$)$_2$, nitro, cyano, hydroxyl, aryl, heteroaryl, or a combination thereof, wherein R$^3$ is C1-20 alkyl, and each R$^2$ independently is H, halo, or C$_{1-10}$ alkyl;
------- is a single or double bond;
a) when X is S, NR$^1$, C(R$^2$)$_2$, or C(R$^2$)$_2$—C(R$^2$)$_2$ then R is a substituted or unsubstituted aryl or substituted or unsubstituted heteroaryl,
wherein each of the substituted aryl and substituted heteroaryl of R is substituted with 1, 2, 3, 4, or 5 substituents,
each substituent on the substituted aryl and substituted heteroaryl of group R independently is C$_{1-20}$ alkyl, C$_{1-20}$ haloalkyl, C$_{1-20}$ alkoxy, C$_{1-20}$ haloalkoxy, halo, —NH$_2$, —NHR$^3$, —N(R$^3$)$_2$, nitro, cyano, hydroxyl, aryl, heteroaryl, or a combination thereof, wherein R$^3$ is C$_{1-20}$ alkyl; and
b) when X is O then R is a substituted aryl or substituted heteroaryl,
wherein each of the substituted aryl and substituted heteroaryl of R is substituted with 1, 2, 3, 4, or 5 substituents,
each substituent on the substituted aryl and substituted heteroaryl of group R independently is C$_{1-20}$ haloalkyl, $C_{1-20}$ haloalkoxy, —NHR³, —N(R³)₂, cyano, aryl, heteroaryl, or a combination thereof, wherein R³ is $C_{1-20}$ alkyl.

13. A dielectric polymer comprising units derived from a monomer according to formula (I) of claim 12.

14. A process for producing a dielectric polymer, comprising
conducting Ring Opening Metathesis Polymerization or vinyl addition polymerization of a monomer of formula (I)

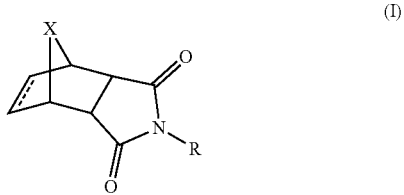

(I)

wherein
X is O, S, NR¹, C(R²)₂, or C(R²)₂—C(R²)₂ wherein R¹ is H, $C_{1-10}$ alkyl, $C_{1-10}$ haloalkyl, substituted or unsubstituted aryl, or substituted or unsubstituted heteroaryl, wherein each of the substituted aryl and substituted heteroaryl of R¹ is substituted with 1, 2, 3, 4, or 5 substituents, each substituent independently is $C_{1-20}$ alkyl, $C_{1-20}$ haloalkyl, $C_{1-20}$ alkoxy, $C_{1-20}$ haloalkoxy, halo, —NH₂, —NHR³, —N(R³)₂, nitro, cyano, hydroxyl, aryl, heteroaryl, or a combination thereof, wherein R³ is C1-20 alkyl, and each R² independently is H, halo, or $C_{1-10}$ alkyl;
------- is a single or double bond;
a) when X is S, NR¹, C(R²)₂, or C(R²)₂—C(R²)₂ then R is a substituted or unsubstituted aryl or substituted or unsubstituted heteroaryl,
wherein each of the substituted aryl and substituted heteroaryl of R is substituted with 1, 2, 3, 4, or 5 substituents,
each substituent on the substituted aryl and substituted heteroaryl of group R independently is $C_{1-20}$ alkyl, $C_{1-20}$ haloalkyl, $C_{1-20}$ alkoxy, $C_{1-20}$ haloalkoxy, -halo, —NH₂, —NHR³, —N(R³)₂, nitro, cyano, hydroxyl, aryl, heteroaryl, or a combination thereof, wherein R³ is $C_{1-20}$ alkyl; and b) when X is O then R is a substituted aryl or substituted heteroaryl,
wherein each of the substituted aryl and substituted heteroaryl of R is substituted with 1, 2, 3, 4, or 5 substituents,
each substituent on the substituted aryl and substituted heteroaryl of group R independently is $C_{1-20}$ haloalkyl, $C_{1-20}$ haloalkoxy, —NHR³, —N(R³)₂, cyano, aryl, heteroaryl, or a combination thereof, wherein R³ is $C_{1-20}$ alkyl.

15. A dielectric polymer, comprising
a polymer backbone and a pendent group,
the polymer backbone comprises
alternating repeat units of a first rigid domain separated by single bonds, or
alternating repeat units of a first rigid domain and a second rigid domain separated by single bonds,
wherein the pendent group is a substituted aromatic group attached to the first rigid domain by a single bond,
wherein the substituted aromatic group is a substituted aryl or substituted heteroaryl, each substituted with 1, 2, 3, 4, or 5 substituents; and
each substituent independently is $C_{1-20}$ haloalkyl, $C_{1-20}$ haloalkoxy, —NHR³, —N(R³)₂, cyano, aryl, or heteroaryl, wherein R³ is $C_{1-20}$ alkyl; and
wherein the dielectric polymer has one or more of the following:
a.) Tg of greater than or equal to 150° C.;
b.) Band gap of greater than or equal to 4.1 eV;
c.) a maximum discharged energy density of greater than 5.0 J/cm³ with efficiency at or above 90% at a temperature of 150° C.;
d.) a maximum discharged energy density of greater than 5.0 J/cm³ at a temperature of 150° C. and an electric field of greater than 650 MV/m or between 650 and 800 MV/m; and
e.) an operating temperature from about −160 to about 250° C.

16. The polymer of claim 15, wherein the first rigid domain is an alicyclic fused ring system.

17. The polymer of claim 15, wherein the second rigid domain is ethylene (—CH=CH—) or ethyne (—C≡C—).

* * * * *